(12) United States Patent
Alstad et al.

(10) Patent No.: US 12,024,305 B2
(45) Date of Patent: Jul. 2, 2024

(54) PYLON SYSTEM FOR COUPLING ENGINE TO VEHICLE

(71) Applicant: HONEYWELL INTERNATIONAL INC., Charlotte, NC (US)

(72) Inventors: Shawn Alstad, Phoenix, AZ (US); Andrew Appleby, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 334 days.

(21) Appl. No.: 17/452,690

(22) Filed: Oct. 28, 2021

(65) Prior Publication Data
US 2023/0133806 A1   May 4, 2023

(51) Int. Cl.
  B64D 27/40  (2024.01)
  B64D 27/10  (2006.01)
  B64D 29/06  (2006.01)

(52) U.S. Cl.
  CPC ............ B64D 27/40 (2024.01); B64D 27/10 (2013.01); B64D 29/06 (2013.01); *B64D 27/404* (2024.01)

(58) Field of Classification Search
  CPC ........ B64D 27/26; B64D 27/10; B64D 29/06; B64D 2027/266
  See application file for complete search history.

(56) References Cited

U.S. PATENT DOCUMENTS

| | | | |
|---|---|---|---|
| 8,820,676 B2 | 9/2014 | Cazals et al. | |
| 10,556,699 B2 | 2/2020 | Pautis et al. | |
| 10,899,463 B2 | 1/2021 | Aten et al. | |
| 2010/0126139 A1* | 5/2010 | Howe | F02K 1/1207 60/226.3 |
| 2012/0080555 A1* | 4/2012 | Lafont | B64D 27/26 244/54 |
| 2015/0246731 A1* | 9/2015 | Tateiwa | B64D 29/02 244/54 |
| 2015/0367947 A1* | 12/2015 | Audart-Noel | B64D 33/04 244/54 |
| 2018/0216644 A1* | 8/2018 | Mateo | F16B 5/04 |
| 2019/0168858 A1 | 6/2019 | Farouz-Fouquet | |

(Continued)

FOREIGN PATENT DOCUMENTS

| | | |
|---|---|---|
| CN | 104002967 A | 8/2014 |
| EP | 2597039 A1 | 5/2013 |

(Continued)

OTHER PUBLICATIONS

Translation of WO2021/198617A1 (Year: 2021).*

*Primary Examiner* — Richard Green
*Assistant Examiner* — Steven J Shur
(74) *Attorney, Agent, or Firm* — Lorenz & Kopf LLP

(57) ABSTRACT

A pylon system for coupling an engine to a vehicle is provided. The pylon system includes a vehicle pylon to be coupled to the vehicle. The vehicle pylon includes a seal along a portion of the vehicle pylon. The pylon system includes an engine pylon including an inboard longeron and an outboard longeron. The inboard longeron is coupled to the outboard longeron at a first end of the engine pylon and is spaced apart from the outboard longeron at a second end of the engine pylon. The engine pylon is to be coupled to the engine, and the engine pylon is slidably coupled to the seal such that the engine pylon is movable relative to the vehicle pylon between at least a first position and a second position.

20 Claims, 14 Drawing Sheets

(56) References Cited

U.S. PATENT DOCUMENTS

2019/0168860 A1   6/2019  Esteie et al.
2021/0071619 A1*  3/2021  Palanisamy ............. F02K 1/763

FOREIGN PATENT DOCUMENTS

| FR | 2971765 B1 | 11/2013 | |
|----|------------|---------|---|
| FR | 3108949 A1 | 10/2021 | |
| WO | WO-2021198617 A1 * | 10/2021 | ............. B64D 27/20 |

* cited by examiner

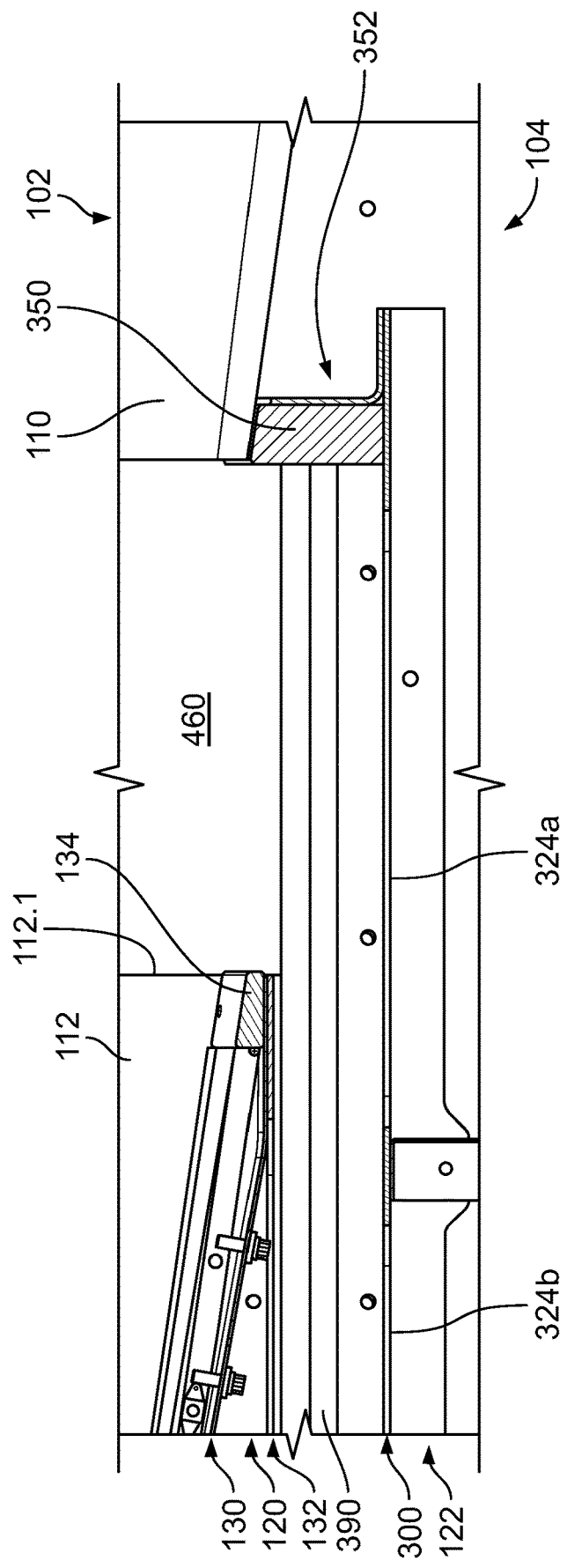

PYLON SYSTEM FOR COUPLING ENGINE TO VEHICLE

TECHNICAL FIELD

The present disclosure generally relates to systems for coupling an engine to a vehicle, and more particularly relates to a pylon system for coupling a gas turbine engine to a vehicle, such as an aircraft.

BACKGROUND

Gas turbine engines may be employed to power various devices. For example, a gas turbine engine may be employed to propel or supply power to a vehicle, such as an aircraft. Due to the size or configuration of the aircraft, in certain instances, the gas turbine engine may need to be mounted on a side of an airframe of the aircraft. In certain examples, the gas turbine engine may include a thrust reverser, which is deployable to move relative to the gas turbine engine to redirect turbine engine exhaust flow in order to generate reverse thrust to assist in stopping the aircraft. Generally, however, most side mounted gas turbine engines are unable to employ a thrust reverser that moves relative to the gas turbine engine to deploy due to mounting constraints.

Accordingly, it is desirable to provide a pylon structure for coupling a gas turbine engine to a vehicle, such as an aircraft, which enables a thrust reverser associated with the gas turbine engine to move relative to the gas turbine engine to deploy. Furthermore, other desirable features and characteristics of the present invention will become apparent from the subsequent detailed description and the appended claims, taken in conjunction with the accompanying drawings and the foregoing technical field and background.

SUMMARY

According to various embodiments, a pylon system for coupling an engine to a vehicle is provided. The pylon system includes a vehicle pylon configured to be coupled to the vehicle. The vehicle pylon includes a seal along a portion of the vehicle pylon. The pylon system includes an engine pylon including an inboard longeron and an outboard longeron. The inboard longeron is coupled to the outboard longeron at a first end of the engine pylon and is spaced apart from the outboard longeron at a second end of the engine pylon. The engine pylon is configured to be coupled to the engine, and the engine pylon is slidably coupled to the seal such that the engine pylon is movable relative to the vehicle pylon between at least a first position and a second position. The engine includes a translating cowl thrust reverser that is movable between at least a first, stowed position and a second, deployed position. The engine pylon is configured to be coupled to the translating cowl thrust reverser of the engine and the engine pylon is configured to move with the translating cowl thrust reverser between at least the first position and the second position. The inboard longeron further comprises a forward seal at the first end. The pylon system includes a vehicle forward seal coupled to the vehicle pylon, and the forward seal is configured to contact the vehicle forward seal in the first position of the engine pylon. At least a portion of the outboard longeron overlaps the inboard longeron at the first end. The pylon system includes at least one spacer coupled to the inboard longeron proximate the outboard longeron to define a uniform exterior surface for the inboard longeron. The inboard longeron includes an inboard seal that extends along the inboard longeron from the first end to the second end. The pylon system includes an engine skin panel coupled to the inboard longeron and the outboard longeron from the first end to the second end, a vehicle skin panel coupled to the vehicle pylon, and the vehicle skin panel is substantially parallel with the engine skin panel. Each of the vehicle skin panel and the engine skin panel define at least one removable access panel. The seal of the vehicle pylon is coupled to the vehicle skin panel. The vehicle pylon includes a vehicle longeron that is coupled to the vehicle skin panel. The inboard longeron includes at least one fastening aperture configured to receive a fastener to couple the inboard longeron to the engine. The at least one fastening aperture includes at least one serrated slot configured to receive the fastener. The seal of the vehicle pylon further comprises a pair of blade seals and the engine pylon is movable relative to the vehicle pylon along the pair of blade seals. The pylon system includes a skin panel coupled to the inboard longeron and the outboard longeron such that the skin panel extends beyond the outboard longeron to define a rail, and the rail is slidably coupled to the seal. The engine is a gas turbine engine and the vehicle is an aircraft.

Also provided is a pylon system for coupling an engine to a vehicle. The pylon system includes a vehicle pylon configured to be coupled to the vehicle. The vehicle pylon includes a vehicle skin panel that defines an exterior surface of the vehicle pylon, and a seal coupled to the vehicle skin panel that extends along a portion of the vehicle pylon. The pylon system includes an engine pylon including an inboard longeron, an outboard longeron and a skin panel that encloses the inboard longeron and the outboard longeron. The inboard longeron is coupled to the outboard longeron at a first end of the engine pylon and spaced apart from the outboard longeron at a second end of the engine pylon. The engine pylon is configured to be coupled to the engine, and the skin panel is coupled to the outboard longeron to define a rail that is slidably coupled to the seal such that the engine pylon is movable relative to the vehicle pylon between at least a first position and a second position.

The engine includes a translating cowl thrust reverser that is movable between at least a first, stowed position and a second, deployed position, the engine pylon is configured to be coupled to the translating cowl thrust reverser of the engine and the engine pylon is configured to move with the translating cowl thrust reverser between at least the first position and the second position. The inboard longeron includes a forward seal at the first end and an inboard seal that extends along the inboard longeron from the first end to the second end. The vehicle pylon includes a vehicle forward seal coupled to the vehicle pylon, and the forward seal is configured to contact the vehicle forward seal in the first position of the engine pylon. At least a portion of the outboard longeron overlaps the inboard longeron at the first end, and at least one spacer is coupled to the inboard longeron proximate the outboard longeron to define a uniform exterior surface for the inboard longeron.

DESCRIPTION OF THE DRAWINGS

The exemplary embodiments will hereinafter be described in conjunction with the following drawing figures, wherein like numerals denote like elements, and wherein:

FIG. 14 is a cross-sectional view of the pylon system, taken from the perspective of line 14-14 of FIG. 13, which illustrates the engine pylon in the second position when the transcowl in the second, deployed position.

DETAILED DESCRIPTION

Figure 1:
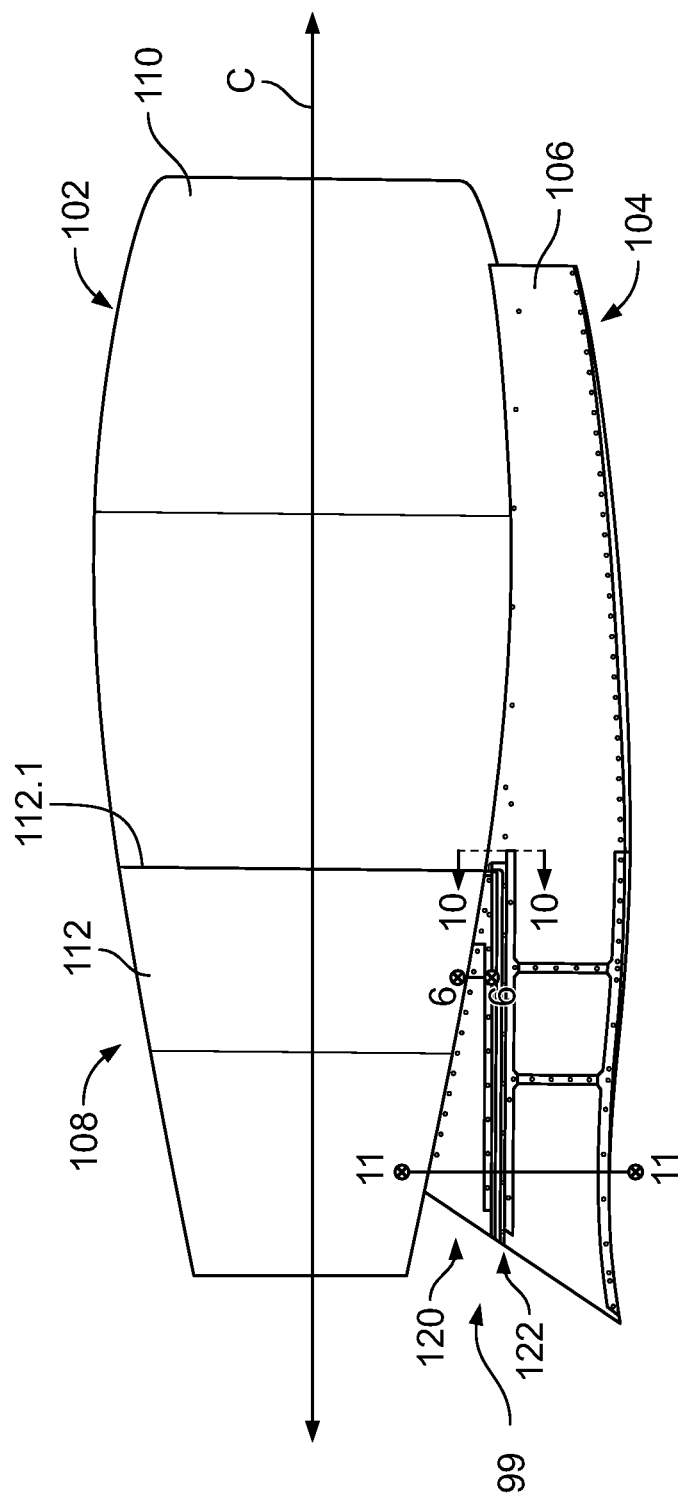
FIG. 1 is a top view of an exemplary pylon system for coupling a gas turbine engine to a vehicle, such as an aircraft, in which a translating cowl or transcowl associated with a thrust reverser of the gas turbine engine is in a first, stowed position and an engine pylon of the pylon system in a first position.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from a pylon system and the use of the pylon system for a side mounted gas turbine engine and a vehicle described herein is merely one exemplary embodiment according to the present disclosure. In addition, while the pylon system is described herein as being used with a gas turbine engine onboard a vehicle, such as a bus, motorcycle, train, automobile, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

With reference to FIG. 1, a pylon system 99 is shown. In one example, the pylon system 99 couples an engine, such as a gas turbine engine 102, to a vehicle, such as an aircraft 104. As will be discussed, the pylon system 99 couples the gas turbine engine 102 to an airframe 106 of the aircraft 104. Generally, the pylon system 99 enables the gas turbine engine 102 to be side or rear mounted on the aircraft 104 while enabling a thrust reverser 108 associated with the gas turbine engine 102 to move over various positions. Generally, side mounted or rear mounted gas turbine engines 102 are located aft of the wings and also above the wings of the aircraft 104. The pylon system 99 may be configured as a left hand pylon or a right hand pylon, which may be attached to an empennage or aft section of the airframe 106. In the example of FIG. 1, the pylon system 99 is configured as a left hand pylon for side mounting the gas turbine engine 102. A right hand pylon for side mounting the gas turbine engine 102 comprises a mirror image of the pylon system 99 shown in FIG. 1. For ease of description, the following discussion will refer to the pylon system 99 as a left hand pylon for side mounting the gas turbine engine 102, but it should be understood that a right hand pylon for side mounting a second gas turbine engine 102 to the aircraft 104 is a mirror image of the pylon system 99 shown and described herein.

Generally, the pylon system 99 enables the gas turbine engine 102 to be mounted on either the left hand side or the right hand side of the airframe 106, aft of the wings. The pylon system 99 enables the aircraft 104 to employ the gas turbine engine 102 with the thrust reverser 108, which improves a stopping power of the aircraft 104, while enabling the thrust reverser 108 to move relative to the gas turbine engine 102 without interfering with the mounting of the gas turbine engine 102 on the airframe 106. In addition, by mounting the gas turbine engine 102 on the side of the aircraft 104, a cabin of the aircraft 104 is quieter because of the additional distance between passenger seats and the location of the gas turbine engine 102. Further, by side mounting the gas turbine engine 102 using the pylon system 99, the aircraft 104 has lower wing clearance, and this enables the use of shorter landing gear, which saves weight. In addition, by side mounting the gas turbine engine 102 using the pylon system 99, less foreign object debris, such as dirt, dust and sand, is ingested by the gas turbine engine 102 during operation.

As the gas turbine engine 102 coupled to the pylon system 99 is any suitable engine including the thrust reverser 108 with a translating cowl or transcowl 112, the gas turbine engine 102 and the thrust reverser 108 will not be discussed in detail herein. Briefly, FIG. 1 is a top view of the gas turbine engine 102 with the transcowl 112 of the thrust reverser 108 in a first, stowed position. The gas turbine engine 102 typically generates thrust by means of an accelerating mass of gas. Generally, the gas turbine engine 102 is substantially encased within an aerodynamically smooth outer covering, such as a nacelle 110. The nacelle 110 substantially surrounds the gas turbine engine 102 and forms an aerodynamically shaped cavity around a centerline C of the gas turbine engine 102, thereby providing a flow path for engine exhaust flow when generating forward thrust. Generally, ambient air enters the gas turbine engine 102 and passes through a fan. A portion of this air is received within a core of the gas turbine engine 102 where it is pressurized by one or more compressors associated with the gas turbine engine 102, and mixed with fuel and ignited within a combustion chamber associated with the gas turbine engine 102. The combustion of the pressurized air and fuel generates combustion products or hot gases known as core flow. The remainder of the air from the fan bypasses the core of the gas turbine engine 102 and is known as fan flow. Together, the core flow and the fan flow mix downstream to form the engine exhaust flow that is discharged from the gas turbine engine 102, generating forward thrust.

The thrust reverser 108 includes a stationary support structure and the transcowl 112. The support structure couples the thrust reverser 108 to the gas turbine engine 102. In this example, the transcowl 112 is axially translatable by an actuator relative to the support structure, and thus the gas turbine engine 102, between the first, stowed position, which is the position depicted in FIG. 1, a second, deployed position, which is the position depicted in FIG. 13, and a third, overstowed position, a detailed cross-section of which depicted in FIG. 12. In the first, stowed position, a leading edge 112.1 of the transcowl 112 is adjacent to, proximate or abuts the nacelle 110, and in the second, deployed position, the leading edge 112.1 of the transcowl 112 is displaced or spaced apart from the nacelle 110 to form an aperture 460 between the transcowl 112 and the nacelle 110. In the third, overstowed position, the leading edge 112.1 compresses a portion of the pylon system 99 and a gap between the leading edge 112.1 and the nacelle 110 is less than the gap between the leading edge 112.1 and the nacelle 110 in the first, stowed position shown in FIG. 1. The actuator associated with the transcowl 112 is in communication with a controller associated with the gas turbine engine 102 or the aircraft 104 and is responsive to one or more control signals to move the transcowl 112 between the first, stowed position, the second, deployed position and the third, overstowed position. The movement of the transcowl 112 moves doors coupled to the transcowl 112 to redirect at least a portion of the engine exhaust flow through the aperture 460 to generate reverse thrust.

Figure 2:
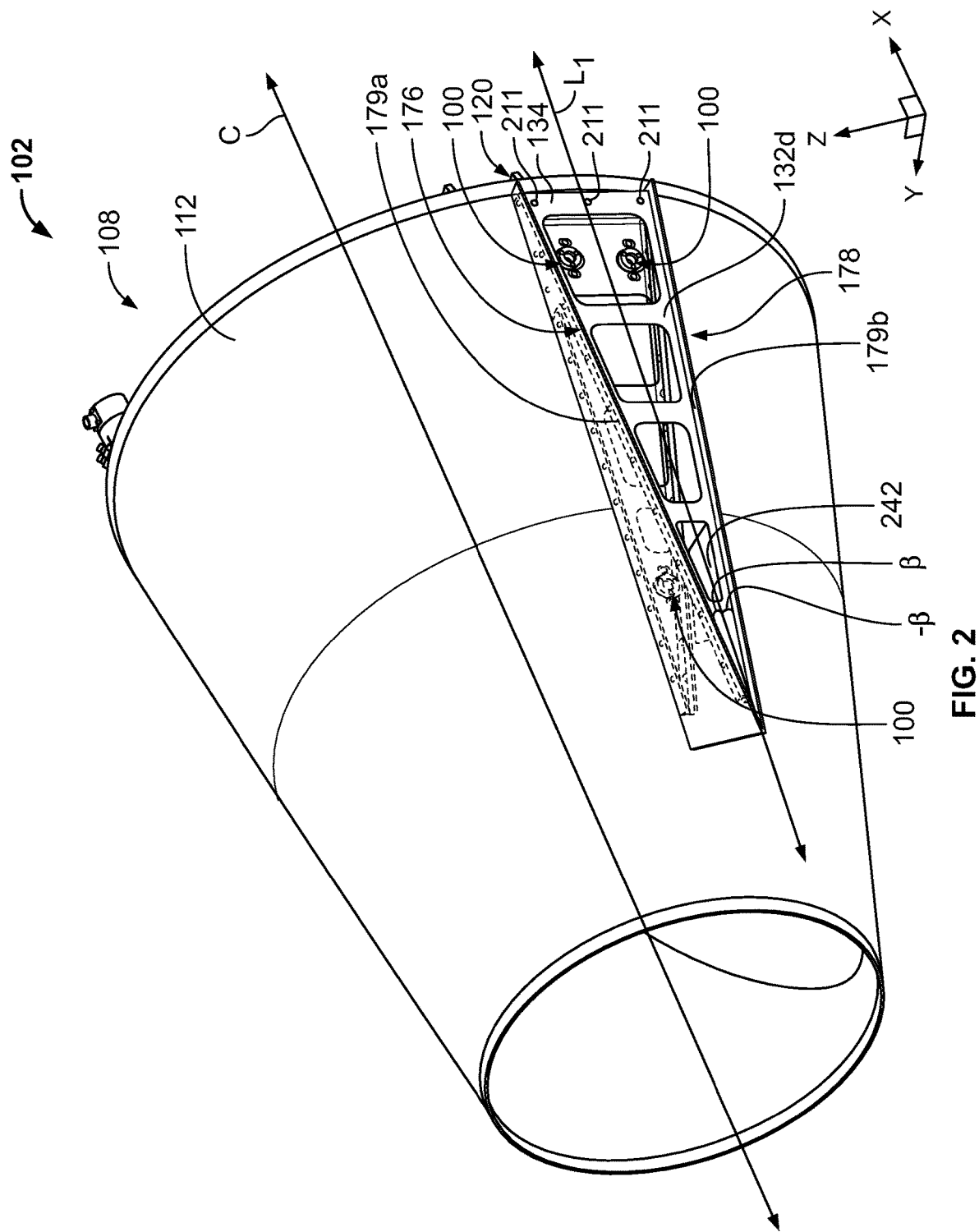
FIG. 2 is a perspective view of the engine pylon of the pylon system coupled to the transcowl, in which the engine pylon is shown uncoupled from the vehicle pylon for clarity.

As shown in FIG. 1, the pylon system 99 includes an engine pylon 120 and a vehicle pylon 122. The pylon system 99 enables the transcowl 112 to move linearly relative to the gas turbine engine 102 and the aircraft 104 between the first, stowed position, the second, deployed position and the third, overstowed position. In the first, stowed position of the transcowl 112, the engine pylon 120 is in a first position (FIGS. 1 and 10) relative to the vehicle pylon 122. In the second, deployed position of the transcowl 112, the engine pylon 120 is in a second position (FIGS. 13 and 14) relative to the vehicle pylon 122. In the third, overstowed position of the transcowl 112, the engine pylon 120 is in a third position (FIG. 12) relative to the vehicle pylon 122. With reference to FIG. 2, the engine pylon 120 is shown. The engine pylon 120 movably couples the transcowl 112 of the gas turbine engine 102 to the vehicle pylon 122 (FIG. 1). In addition, as will be discussed, the engine pylon 120 enables the transcowl 112 of the gas turbine engine 102 to be adjustably coupled to the vehicle pylon 122. By enabling the adjustment of the gas turbine engine 102 relative to the vehicle pylon 122, a location and orientation of the gas turbine engine 102 relative to the airframe 106 (FIG. 1) is adjustable to account for manufacturing tolerances, which reduces aerodynamic drag by enabling the alignment of the engine pylon 120 with the airframe 106 (FIG. 1).

Figure 3:
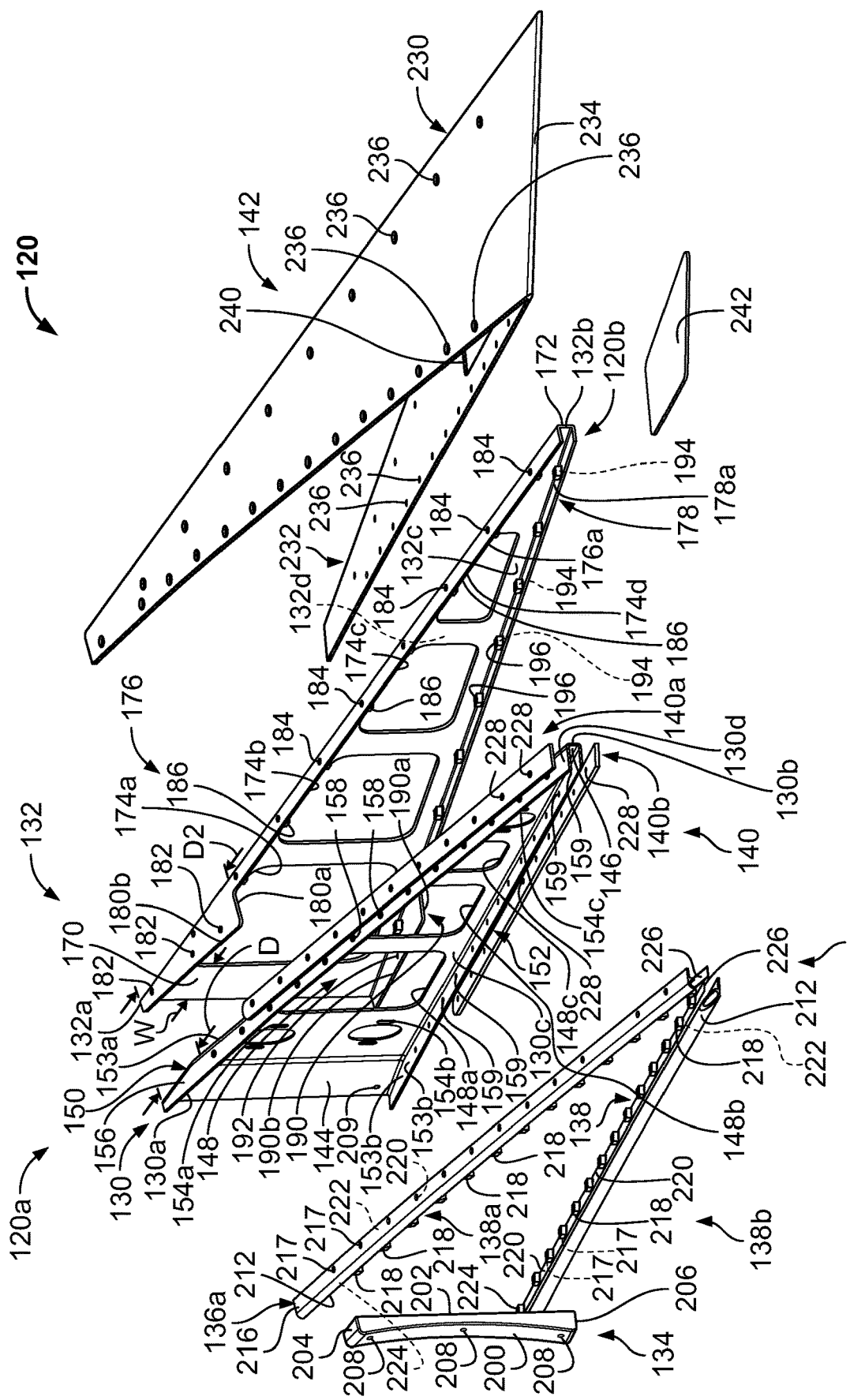
FIG. 3 is an exploded view of the engine pylon.

With reference to FIG. 3, an exploded view of the engine pylon 120 is shown. In one example, the engine pylon 120 includes a first, inboard longeron 130, a second, outboard longeron 132, a forward seal 134, at least one elongated seal 136, at least one fastening assembly 138, at least one spacer 140 and a skin panel 142. The inboard longeron 130 is composed of a polymer-based material, metal, or metal alloy, and is cast, stamped, machined, additively manufactured, etc. In this example, the inboard longeron 130 has a triangular shape, with a first base 144 defined at a first end 130a, and a first apex 146 defined at a second end 130b. The inboard longeron 130 also has a first side 130c opposite a second side 130d. The inboard longeron 130 is substantially solid at the first base 144 and the first apex 146, but defines a plurality of cut-outs 148 between the first base 144 and the first apex 146. In this example, the inboard longeron 130 defines three cut-outs 148a-148c. The cut-outs 148a-148c reduce a mass associated with the inboard longeron 130. The inboard longeron 130 also defines a first flange 150, a second flange 152 opposite the first flange 150, and at least one or a plurality of fastening apertures 154.

Figure 4:
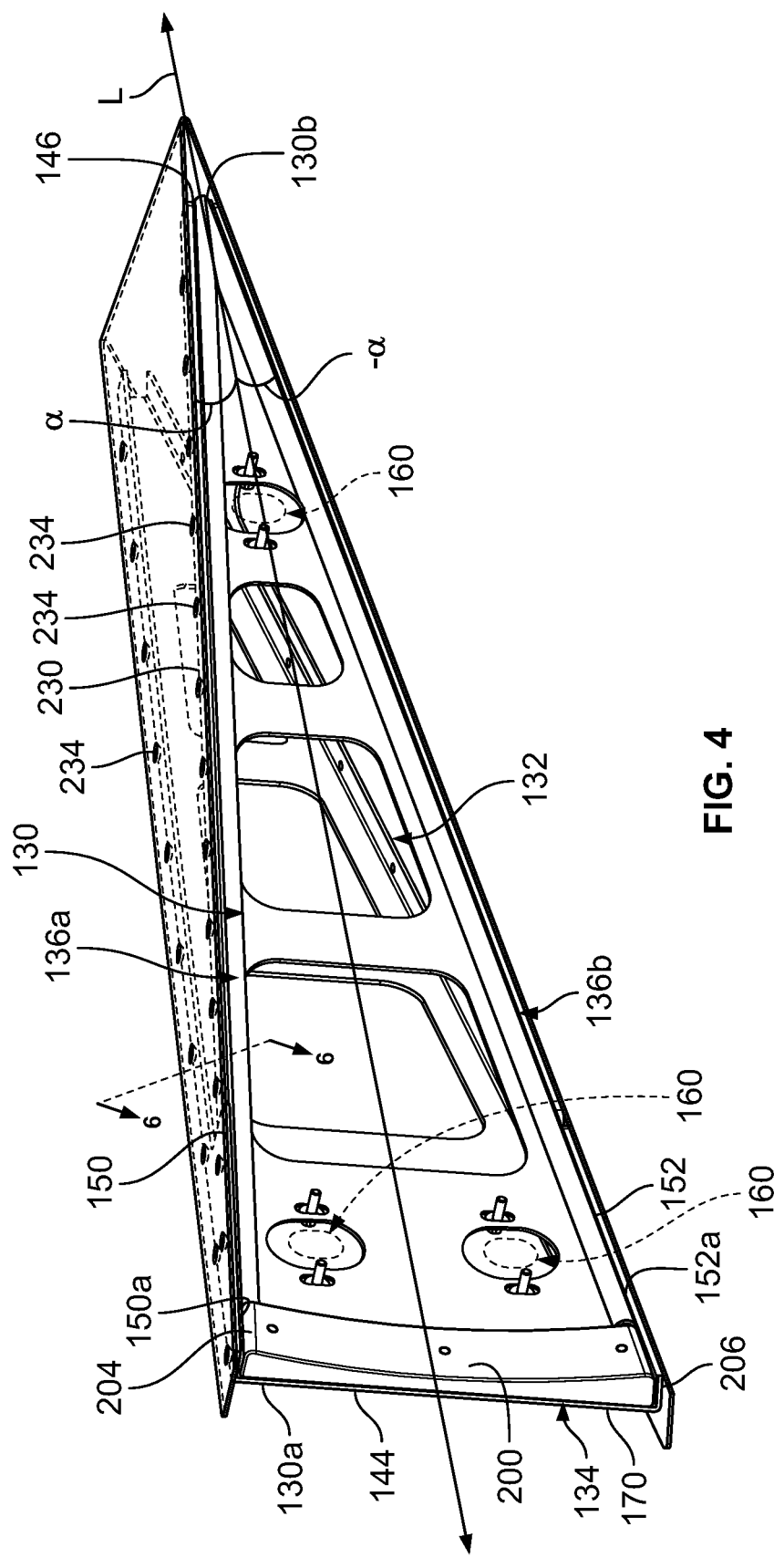
FIG. 4 is a perspective view of the engine pylon, which illustrates an inboard longeron of the engine pylon.

With brief reference to FIG. 4, the inboard longeron 130 extends along a longitudinal axis L, which is a center line for the inboard longeron 130, and the first flange 150 and the second flange 152 extend along an axis transverse or oblique to the longitudinal axis L. In one example, the first flange 150 extends at an angle α relative to the longitudinal axis L and the second flange 152 extends at a negative of the angle α relative to the longitudinal axis L. The angle α is about 5 degrees to about 8 degrees. The first flange 150 and the second flange 152 extend outwardly from the first base 144 at the first end 130a to the first apex 146 at the second end 130b. The first flange 150 and the second flange 152 are defined along opposite outboard edges 153a, 153b of the inboard longeron 130 and extend outwardly from the first side 130c. With reference back to FIG. 3, generally, the first flange 150 and the second flange 152 are spaced apart at the first apex 146 to enable the receipt of mechanical fasteners proximate the first apex 146 to couple the skin panel 142, the spacer 140 and the elongated seal 136 to the inboard longeron 130. In addition, the space defined between the first flange 150 and the second flange 152 at the first apex 146 enables the at least one elongated seal 136 to be positioned between the first flange 150 and the second flange 152 at the first apex 146. The first flange 150 includes a chamfer 156 that extends for a distance D from the first end 130a. In one example, the distance D is about 2 inches (in.) to about 4 inches (in.) and is about the same or greater than a width W of a second base 170 of the outboard longeron 132. By defining the chamfer 156 for the distance D, when the inboard longeron 130 is coupled to the outboard longeron 132, the second end 130*b* of the inboard longeron 130 is angled outward or away from the outboard longeron 132. From the chamfer 156 to the first apex 146, the first flange 150 defines a plurality of spaced apart holes 158. Each of the holes 158 is configured to receive a fastener, such as a rivet, therethrough to couple the elongated seal 136, the spacer 140 and the skin panel 142 to the first flange 150. The second flange 152 defines a plurality of spaced apart second holes 159. Each of the second holes 159 is configured to receive a fastener, such as a rivet, therethrough to couple the elongated seal 136, the spacer 140 and the skin panel 142 to the second flange 152. The spacing of the holes 158 and the second holes 159 is generally predetermined to provide additional stability for the elongated seal 136. Generally, the inboard longeron 130 and the outboard longeron 132 are triangular in shape to correspond with the shape of the vehicle pylon 122. It should be noted that the shape of the inboard longeron 130 and the outboard longeron 132 may vary to correspond with different vehicle pylon shapes. The angle α is also generally predetermined based on the vehicle pylon 122, and may be different for different vehicle pylon shapes.

Figure 5:
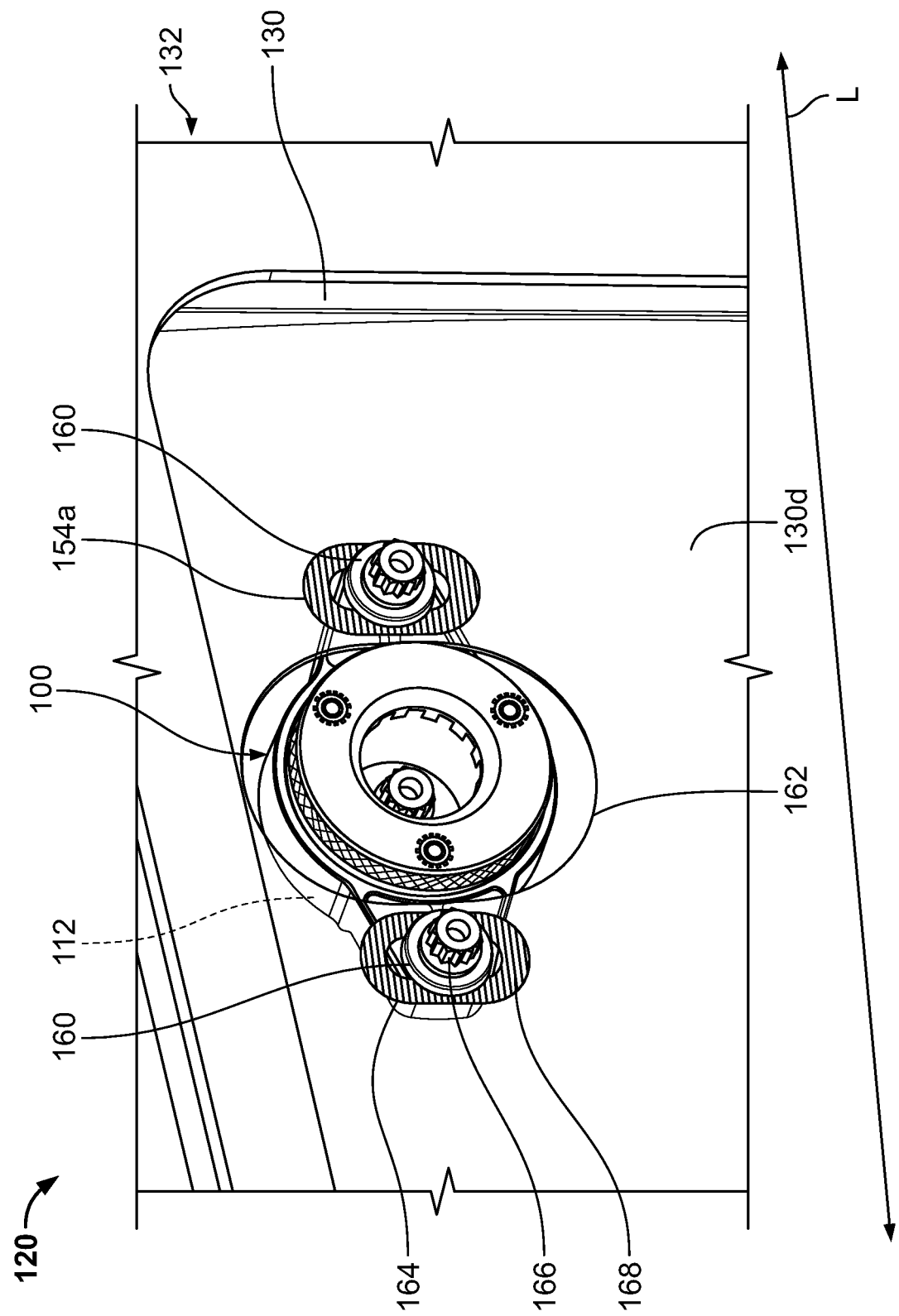
FIG. 5 is a detail view of a fastening aperture associated with the inboard longeron.

The fastening apertures 154 couple the inboard longeron 130 to the transcowl 112 of the gas turbine engine 102 (FIG. 1). In this example, the inboard longeron 130 includes three fastening apertures 154*a*-154*c*, with two of the fastening apertures 154*a*, 154*b* defined proximate the first base 144 and the fastening aperture 154*c* defined proximate the first apex 146. Each of the fastening apertures 154*a*-154*c* are the same, and thus, a single fastening aperture 154*a* will be discussed in detail herein. With reference to FIG. 5, in one example, the fastening aperture 154*a* includes at least one or a pair of fastening slots 160 and a central bore 162. The fastening slots 160 are defined so as to be spaced apart from the central bore 162 and opposite each other about the central bore 162. Each of the fastening slots 160 are elongated along an axis that is substantially perpendicular to the longitudinal axis L. Each of the fastening slots 160 define a plurality of slot serrations 164 about a perimeter of the fastening slot 160 on the second side 130*d* of the inboard longeron 130. The slot serrations 164 cooperate with a serrated washer 166 associated with a mechanical fastener 168 to enable a vertical position of the inboard longeron 130, and thus, the engine pylon 120 to be adjusted relative to the vehicle pylon 122 (FIG. 1). The slot serrations 164 are spaced apart in any predetermined pattern to define a plurality of defined positions for coupling the mechanical fastener 168 to the inboard longeron 130. In this example, the mechanical fastener 168 is the bolt 147 associated with the locking positioning system 100 of commonly assigned U.S. application Ser. No. 17/452,687 titled "Locking Positioning Systems" to Alstad, the relevant portion of which is incorporated herein by reference. The central bore 162 is sized to enable a portion of the locking positioning system 100 to be positioned through the inboard longeron 130 to be coupled to the transcowl 112 (FIG. 1). It should be noted that the use of the locking positioning system 100 for adjustably coupling the inboard longeron 130 to the transcowl 112 is merely an example, as other mechanical fasteners may be employed and the fastening apertures 154*a*-154*c* may be modified to accommodate these mechanical fasteners. Moreover, a combination of locking positioning systems 100 and mechanical fasteners may be employed such that the inboard longeron 130 may not be coupled to the transcowl 112 via three locking positioning systems 100 as shown in FIG. 2.

With reference to FIG. 3, the outboard longeron 132 is coupled to the inboard longeron 130. The outboard longeron 132 is composed of a polymer-based material, metal, or metal alloy, and is cast, stamped, machined, additively manufactured, etc. In this example, the outboard longeron 132 has a triangular shape, with the second base 170 defined at a first end 132*a*, and a second apex 172 defined at a second end 132*b*. The outboard longeron 132 also has a first side 132*c* opposite a second side 132*d*. The second base 170 of the outboard longeron 132 is coupled to the first base 144 of the inboard longeron 130, and the second apex 172 is spaced apart from the first apex 146 of the inboard longeron 130. The outboard longeron 132 is substantially solid at the second base 170 and the second apex 172, but defines a plurality of cut-outs 148 between the second base 170 and the second apex 172. In this example, the outboard longeron 132 defines four cut-outs 174*a*-174*d*. The cut-outs 174*a*-174*d* reduce a mass associated with the outboard longeron 132. The outboard longeron 132 also defines a first outboard flange 176 and a second outboard flange 178 opposite the first outboard flange 176.

With brief reference to FIG. 2, the outboard longeron 132 extends along a longitudinal axis L1, which is a center line for the outboard longeron 132, and the first outboard flange 176 and the second outboard flange 178 extend along an axis transverse or oblique to the longitudinal axis L1. The longitudinal axis L of the inboard longeron 130 is oblique to the longitudinal axis L1 of the outboard longeron 132. In one example, the first outboard flange 176 extends at an angle β relative to the longitudinal axis L1 and the second outboard flange 178 extends at a negative of the angle β relative to the longitudinal axis L1. The angle β is about 5 degrees to about 8 degrees. The first outboard flange 176 and the second outboard flange 178 extend outwardly from the second base 170 at the first end 132*a* to the second apex 172 at the second end 132*b*. The first outboard flange 176 and the second outboard flange 178 are defined along opposite outboard edges 179*a*, 179*b* of the outboard longeron 132 and extend outwardly from the first side 132*c* (FIG. 3). With reference back to FIG. 3, generally, the first outboard flange 176 and the second outboard flange 178 are spaced apart at the second apex 172 to enable the receipt of mechanical fasteners, such as rivets, proximate the second apex 172 to couple the skin panel 142 to the outboard longeron 132.

The first outboard flange 176 includes a projection 180. The projection 180 is triangular, and has a projection base 180*a* that extends outwardly from the first outboard flange 176. An edge 180*b* of the projection 180 tapers from the projection base 180*a* to the second apex 174. The projection 180 is sized to overlap or overlie a portion of the first flange 150 of the inboard longeron 130 at the first end 130*a*. The projection 180 also includes projection holes 182 to receive mechanical fasteners to couple the outboard longeron 132 to the inboard longeron 130 at the respective first end 130*a*, 132*a*. The projection 180 extends for a distance D2 from the first end 132*a*. In one example, the distance D2 is about 5 inches (in.) to about 15 inches (in.). By defining the projection 180 for the distance D2, the outboard longeron 132 reinforces the inboard longeron 130 at the first end 130*a* and proximate the fastening apertures 154 when the inboard longeron 130 is coupled to the outboard longeron 132. From the projection 180 to the second apex 172, the first outboard flange 176 defines a plurality of spaced apart bores 184. Each of the bores 184 is configured to receive a fastener, such as a rivet, therethrough to couple the skin panel 142 to the first outboard flange 176. In this example, an interior surface 176a of the first outboard flange 176 includes a plurality of nut plates 186. Each of the nut plates 186 is coupled to the interior surface 176a via rivets, for example, and is coaxial to a respective one of the bores 184. The nut plates 186 receive the rivet inserted into the respective bore 184 to couple the skin panel 142 to the outboard longeron 132.

The second outboard flange 178 includes a second projection 190. The second projection 190 is triangular, and has a second projection base 190a that extends outwardly from the second outboard flange 178. An edge 190b of the second projection 190 tapers from the second projection base 190a to the second apex 174. The second projection 190 is sized to overlap or overlie a portion of the second flange 152 of the inboard longeron 130 at the first end 130a. The second projection 190 also includes second projection holes 192 to receive mechanical fasteners to couple the outboard longeron 132 to the inboard longeron 130 at the respective first end 130a, 132a. The second projection 190 extends for the distance D2 from the first end 132a. By defining the second projection 190 for the distance D2, the outboard longeron 132 reinforces the inboard longeron 130 at the first end 130a and proximate the fastening apertures 154 when the inboard longeron 130 is coupled to the outboard longeron 132. From the second projection 190 to the second apex 172, the second outboard flange 178 defines a plurality of spaced apart second bores 194. Each of the second bores 194 is configured to receive a fastener, such as a rivet, therethrough to couple the skin panel 142 to the second outboard flange 178. In this example, an interior surface 178a of the second outboard flange 178 includes a plurality of second nut plates 196. Each of the second nut plates 196 is coupled to the interior surface 172a via rivets, for example, and is coaxial to a respective one of the second bores 194. The second nut plates 196 receive the rivet inserted into the respective second bore 194 to couple the skin panel 142 to the outboard longeron 132.

The forward seal 134 creates a seal between the transcowl 112 and the engine pylon 120 (FIG. 2). The forward seal 134 is composed of an elastomeric material, and is cast, molded, etc. The forward seal 134 has a first seal surface 200 opposite a second seal surface 202, and a first seal end 204 opposite a second seal end 206. In one example, the first seal surface 200 has a concave curvature to comport with the curvature of the transcowl 112 (FIG. 2) and to assist in forming a seal against the surface of the transcowl 112 (FIG. 2). The second seal surface 202 is substantially planar to mate against a surface of the first base 144 of the inboard longeron 130. In one example, seal fastening bores 208 are defined through the first seal surface 200 and the second seal surface 202 to couple the forward seal 134 to the inboard longeron 130 and the outboard longeron 132. Corresponding seal fastening bores 209 are defined in the first base 144 of the inboard longeron 130 and seal fastening bores 211 are defined in the second base 170 of the outboard longeron 132 (FIG. 2). Mechanical fasteners, such as screws, are inserted through the seal fastening bores 209, 211 and seal fastening bores 208 to couple the forward seal 134 to the inboard longeron 130 and the outboard longeron 132. Generally, the forward seal 134 is coupled to the inboard longeron 130 and the outboard longeron 132 such that the forward seal 134 extends beyond the first end 130a of the inboard longeron 130 and the first end 132a of the outboard longeron 132. It should be noted that the forward seal 134 may be coupled to the inboard longeron 130 and/or the outboard longeron 132 via any technique, including, but not limited to, adhesives. With reference to FIG. 4, the first seal end 204 is coupled and positioned adjacent to a surface 150a of the first flange 150 of the inboard longeron 130. The second seal end 206 is coupled and positioned adjacent to a surface 152a of the second flange 152 of the inboard longeron 130.

In this example, the at least one elongated seal 136 comprises a pair of elongated seals 136a, 136b. The pair of elongated seals 136a, 136b are coupled to the first flange 150 and the second flange 152, respectively, to extend from the forward seal 134 to the first apex 146. Each elongated seal 136a, 136b is composed of an elastomeric material, and is extruded, cast, molded, etc. Each of the elongated seals 136a, 136b is the same, and includes a first elongated end 210 opposite a second elongated end 212, a bulb 214 and a fastening strip 216 (FIG. 3). The first elongated end 210 of the elongated seal 136a is positioned adjacent to the first seal end 204 of the forward seal 134 and extends from the forward seal 134 to the first apex 146. The first elongated end 210 of the elongated seal 136b is positioned adjacent to the second seal end 206 of the forward seal 134 and extends from the forward seal 134 to the first apex 146. The second elongated end 212 of the elongated seals 136a, 136b is coupled to the first apex 146. With reference back to FIG. 3, the bulb 214 has an oval cross-section, and extends outwardly from the elongated seal 136a, 136b to provide sealing against the transcowl 112 (FIG. 2). The fastening strip 216 is defined adjacent to the bulb 214, and extends from the first elongated end 210 to the second elongated end 212. The fastening strip 216 is planar, and includes spaced apart seal holes 217. The seal holes 217 are coaxially aligned with respective ones of the holes 158 and the second holes 159 to couple the elongated seals 136a, 136b to the respective one of the first flange 150 and the second flange 152.

In this example, the at least one fastening assembly 138 comprises a pair of fastening assemblies 138a, 138b. In one example, each of the fastening assemblies 138a, 138b is a nut plate strip, which includes a plurality of nut plates 218 fixedly coupled to an elongated body 220. Each of the nut plates 218 and the bodies 220 are composed of a metal or metal alloy, and are stamped, cast, forged, additively manufactured, etc. The nut plates 218 are generally formed discretely from the respective body 220, and are coupled to the respective body 220 via rivets, for example. Each nut plate 218 is coaxial with a hole 222 defined through the body 220. Each body 220 has a first body end 224 opposite a second body end 226. The first body end 224 is coupled adjacent to the forward seal 134, and the second body end 226 extends to the first apex 146. The fastening assembly 138a extends along the first flange 150, and the fastening assembly 138b extends along the second flange 152. As will be discussed, the fastening assemblies 138a, 138b enable the respective the elongated seal 136a, 136b, the spacer 140, and the skin panel 142 to be coupled to the respective first flange 150 and the second flange 152.

In this example, the at least one spacer 140 comprises a pair of spacers 140a, 140b. The spacers 140a, 140b are composed of a metal or metal alloy, and are stamped, cast, machined, additively manufactured, etc. The spacers 140a, 140b comprise elongated strips, which extend from proximate the respective projection 180 and second projection 190 along the respective first flange 150 and second flange 152 to the respective first apex 146 and second apex 172 to provide a uniform surface for the skin panel 142. Stated another way, the spacers 140a, 140b have a thickness which is substantially equal to a thickness of the projection 180 and the second projection 190 to define a smooth coupling surface along the inboard longeron 130 for the skin panel 142. Each of the spacers 140a, 140b defines a plurality of coupling holes 228 that are spaced apart along the spacer 140a, 140b. The coupling holes 228 are coaxially aligned with respective holes 222 of the fastening assemblies 138a, 138b.

The skin panel 142 is coupled to the inboard longeron 130 and the outboard longeron 132 to define a smooth exterior surface for the engine pylon 120. The skin panel 142 is composed of a polymer-based material, metal, or metal alloy, and is stamped, machined, cast, additively manufactured, etc. The skin panel 142 includes a first skin panel surface 230 and a second skin panel surface 232, which are interconnected by a fold or bend 234. The first skin panel surface 230 is coupled along the first flange 150 of the inboard longeron 130 and the first outboard flange 176 of the outboard longeron 132 to define an exterior surface along a top of the engine pylon 120. The second skin panel surface 232 is coupled along the second flange 152 of the inboard longeron 130 and the second outboard flange 178 of the outboard longeron 132 to define an exterior surface along a bottom of the engine pylon 120. The bend 234 interconnects the first skin panel surface 230 with the second skin panel surface 232 and encloses the engine pylon 120 at the first apex 146 and the second apex 172. Thus, the skin panel 142 substantially surrounds the inboard longeron 130 and the outboard longeron 132 and substantially encloses the engine pylon 120.

The first skin panel surface 230 and the second skin panel surface 232 each include a plurality of skin panel bores 236. The skin panel bores 236 are defined through the skin panel 142 for receipt of a mechanical fastener, such as a rivet 238 (FIG. 6), to couple the skin panel 142 to the inboard longeron 130 and outboard longeron 132. The skin panel bores 236 of the first skin panel surface 230 are coaxially aligned with a respective one of the holes 158 of the first flange 150, the coupling holes 228 of the spacer 140a, the seal holes 217 of the elongated seal 136a, the projection holes 182 of the projection 180, and the holes 222 of the fastening assembly 138a; and the bores 184 of the first outboard flange 176. The skin panel bores 236 of the second skin panel surface 232 are coaxially aligned with a respective one of the second holes 159 of the second flange 152, the coupling holes 228 of the spacer 140b, the seal holes 217 of the elongated seal 136b, the second projection holes 192 of the second projection 190, and the holes 222 of the fastening assembly 138b; and the second bores 194 of the second outboard flange 178.

Figure 6:
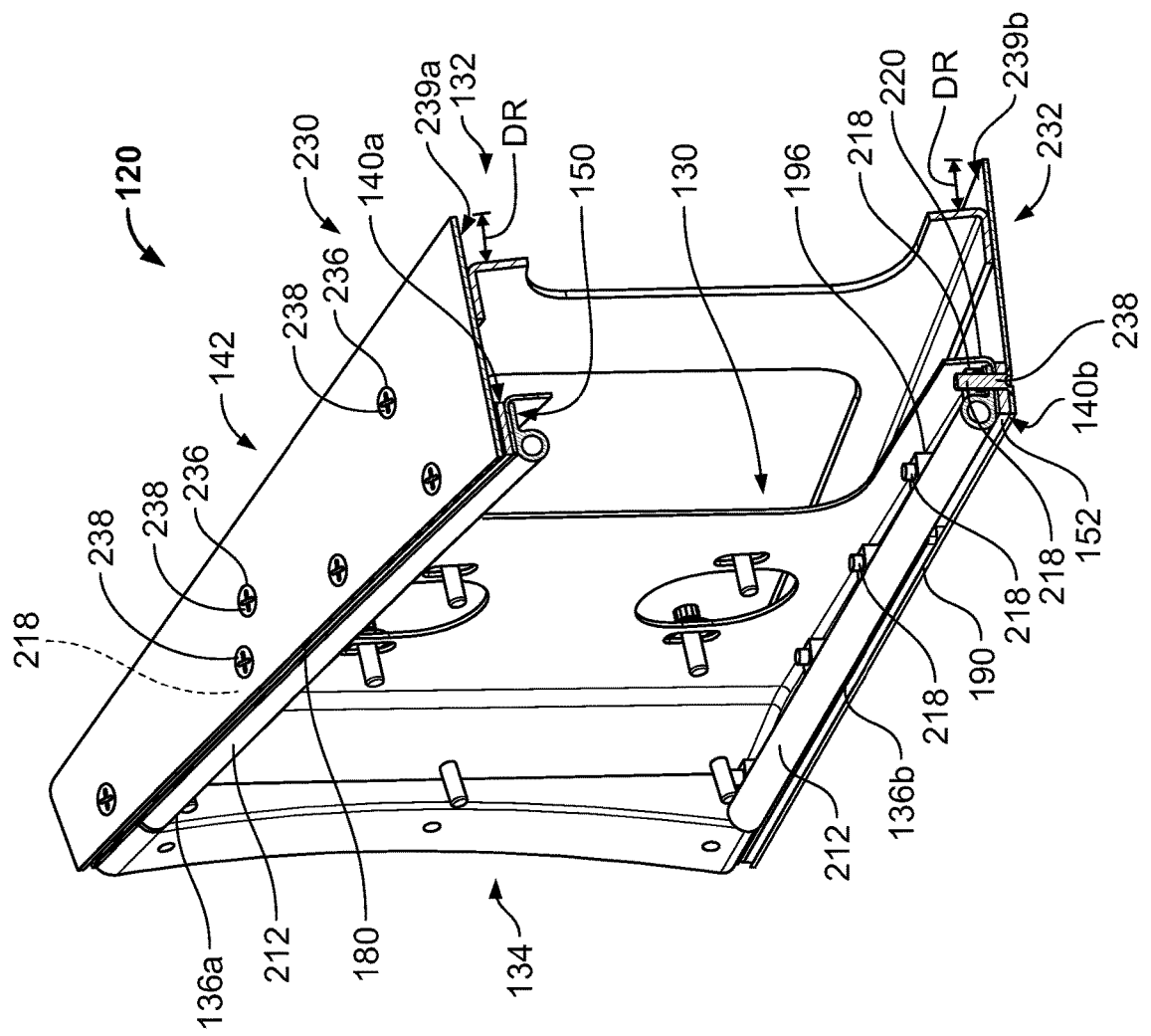
FIG. 6 is a cross-sectional view of the engine pylon, taken along line 6-6 of FIG. 1.

In one example, with reference to FIG. 6, where the projection 180 overlies the first flange 150, the rivets 238 are inserted through respective ones of the skin panel bores 236 of the first skin panel surface 230, the projection holes 182 of the projection 180, the seal holes 217 of the elongated seal 136a, the holes 222 of the fastening assembly 138a and are secured to the respective one of the nut plates 218. Where the spacer 140a overlies the first flange 150, the rivets 238 are inserted through respective ones of the skin panel bores 236 of the first skin panel surface 230, the coupling holes 228 of the spacer 140a, the seal holes 217 of the elongated seal 136a, the holes 222 of the fastening assembly 138a and are secured to the respective one of the nut plates 218. Where the second projection 190 overlies the second flange 152, the rivets 238 are inserted through respective ones of the skin panel bores 236 of the second skin panel surface 232, the second projection holes 192 of the second projection 190, the seal holes 217 of the elongated seal 136b, the holes 222 of the fastening assembly 138b and are secured to the respective one of the nut plates 218. Where the spacer 140b overlies the second flange 152, the rivets 238 are inserted through respective ones of the skin panel bores 236 of the second skin panel surface 232, the coupling holes 228 of the spacer 140b, the seal holes 217 of the elongated seal 136b, the holes 222 of the fastening assembly 138b and are secured to the respective one of the nut plates 218. Generally, with reference to FIG. 6, the first skin panel surface 230 and the second skin panel surface 232 are sized such that a portion of the first skin panel surface 230 and the second skin panel surface 232 are each cantilevered over the outboard longeron 132 to define a first rail and a second rail, indicated by reference numerals 239a, 239b, respectively. In one example, the first skin panel surface 230 and the second skin panel surface 232 extend a distance DR beyond the second side 132d of the outboard longeron 132. The distance DR is about 0.5 inches (in.) to about 1.0 inches (in.). The first rail 239a and the second rail 239b defined by the respective portion of the first skin panel surface 230 and the second skin panel surface 232 that overhangs the outboard longeron 132 enables the engine pylon 120 to move relative to the vehicle pylon 122, as will be discussed.

With reference back to FIG. 3, the second skin panel surface 232 defines an access opening 240, which is enclosed with a removable access panel 242. The access opening 240 is defined proximate the bend 234 to provide access to the fastening aperture 154c to enable adjustment of the coupling between the engine pylon 120 and the transcowl 112 during installation and use. The access opening 240 is generally sized to enable an operator to insert their hand and manipulate the fastening device coupled to the fastening aperture 154c, such as the locking positioning system 100, previously incorporated by reference herein. The access panel 242 is composed of a polymer-based material, metal, or metal alloy, and is stamped, machined, cast, additively manufactured, etc. The access panel 242 is coupled to the access opening 240 via press-fit, mechanical fasteners, etc. Generally, the access panel 242 is coupled to the access opening 240 to be removable for maintenance, but secured during operation of the aircraft 104 (FIG. 1).

Figure 7:
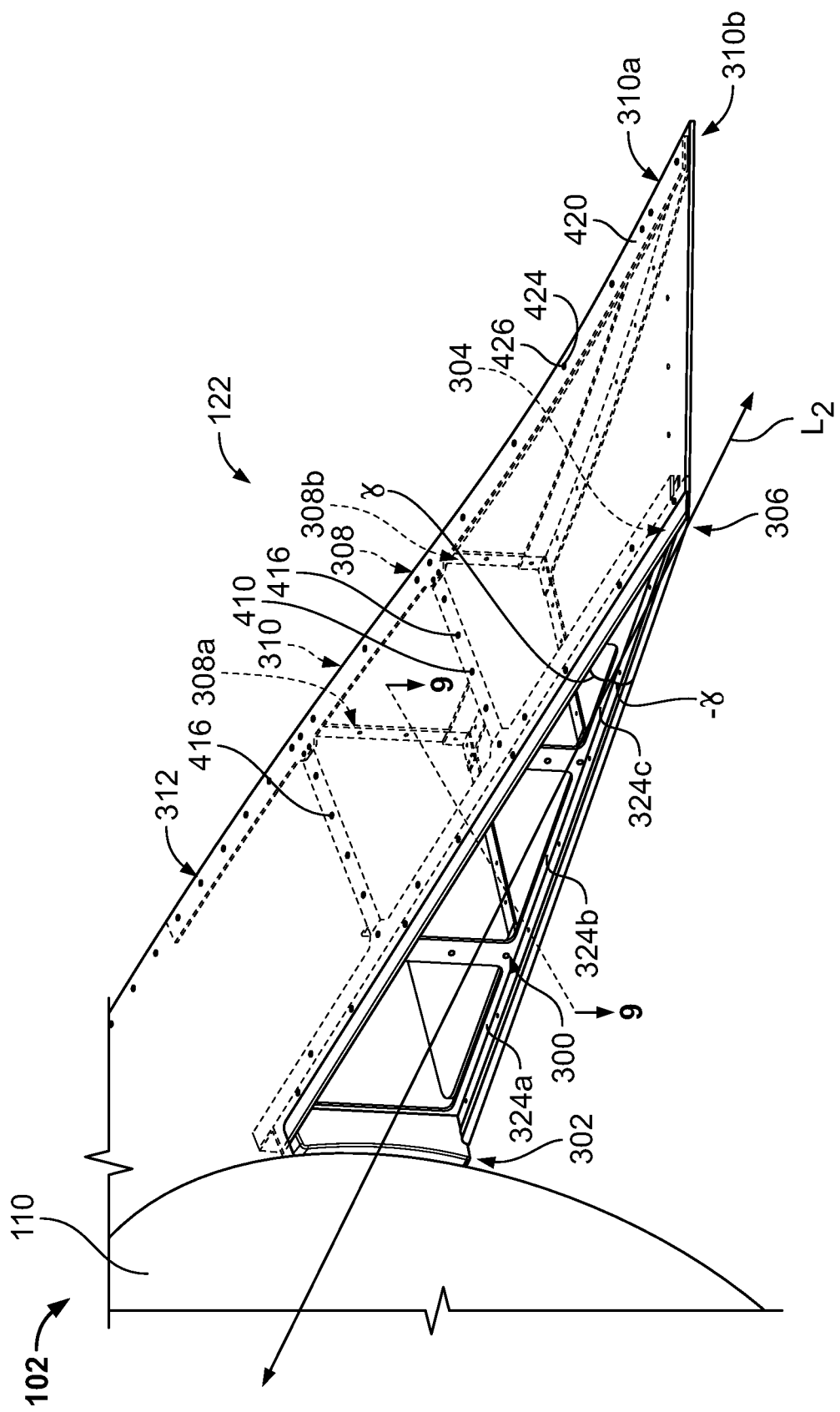
FIG. 7 is a perspective view of a vehicle pylon of the pylon system, in which the engine pylon is removed for clarity.
Figure 8:
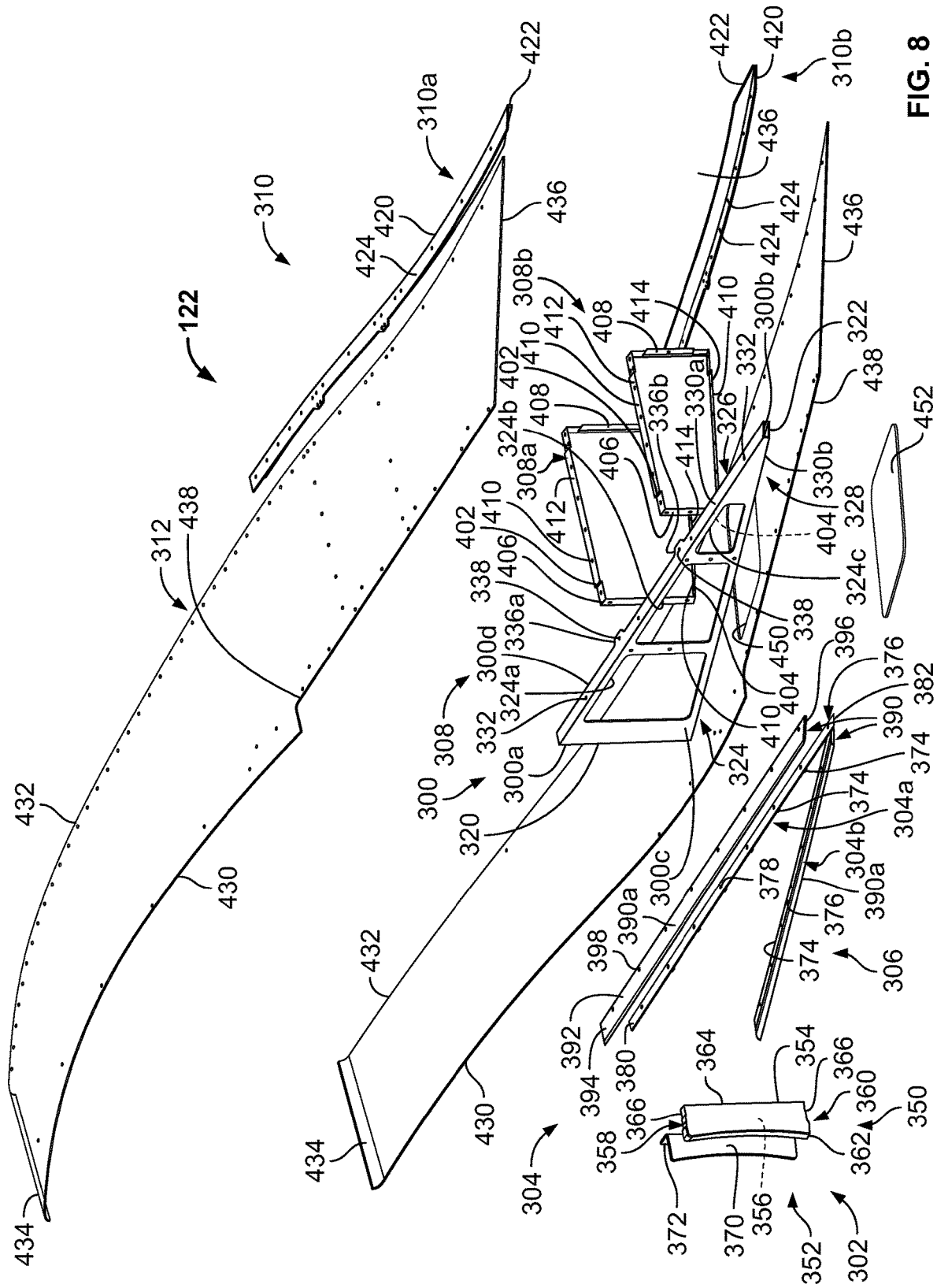
FIG. 8 is an exploded view of the vehicle pylon.

With reference to FIG. 7, the vehicle pylon 122 is shown in greater detail. In FIG. 7, the engine pylon 120 has been removed for clarity. In one example, the vehicle pylon 122 includes a vehicle or airframe longeron 300, a forward seal assembly 302, at least one seal fastening assembly 304, at least one seal 306, at least one vehicle or airframe rib 308, at least one vehicle or airframe beam 310 and at least one vehicle skin panel or skin panel 312. With reference to FIG. 8, the airframe longeron 300 is composed of polymer-based material, metal, or metal alloy, and is cast, forged, stamped, additively manufactured, etc. The airframe longeron 300 has a triangular shape, with an airframe base 320 defined at a first end 300a, and an airframe apex 322 defined at a second end 300b. The airframe longeron 300 also has a first side 300c opposite a second side 300d. The airframe longeron 300 is substantially solid at the airframe base 320 and the airframe apex 322, but defines a plurality of cut-outs 324 between the airframe base 320 and the airframe apex 322. In this example, the airframe longeron 300 defines three cut-outs 324a-324c. The cut-outs 324a-324c reduce a mass associated with the airframe longeron 300. The airframe longeron 300 also defines a first airframe flange 326 and a second airframe flange 328 opposite the first airframe flange 326.

Figure 9:
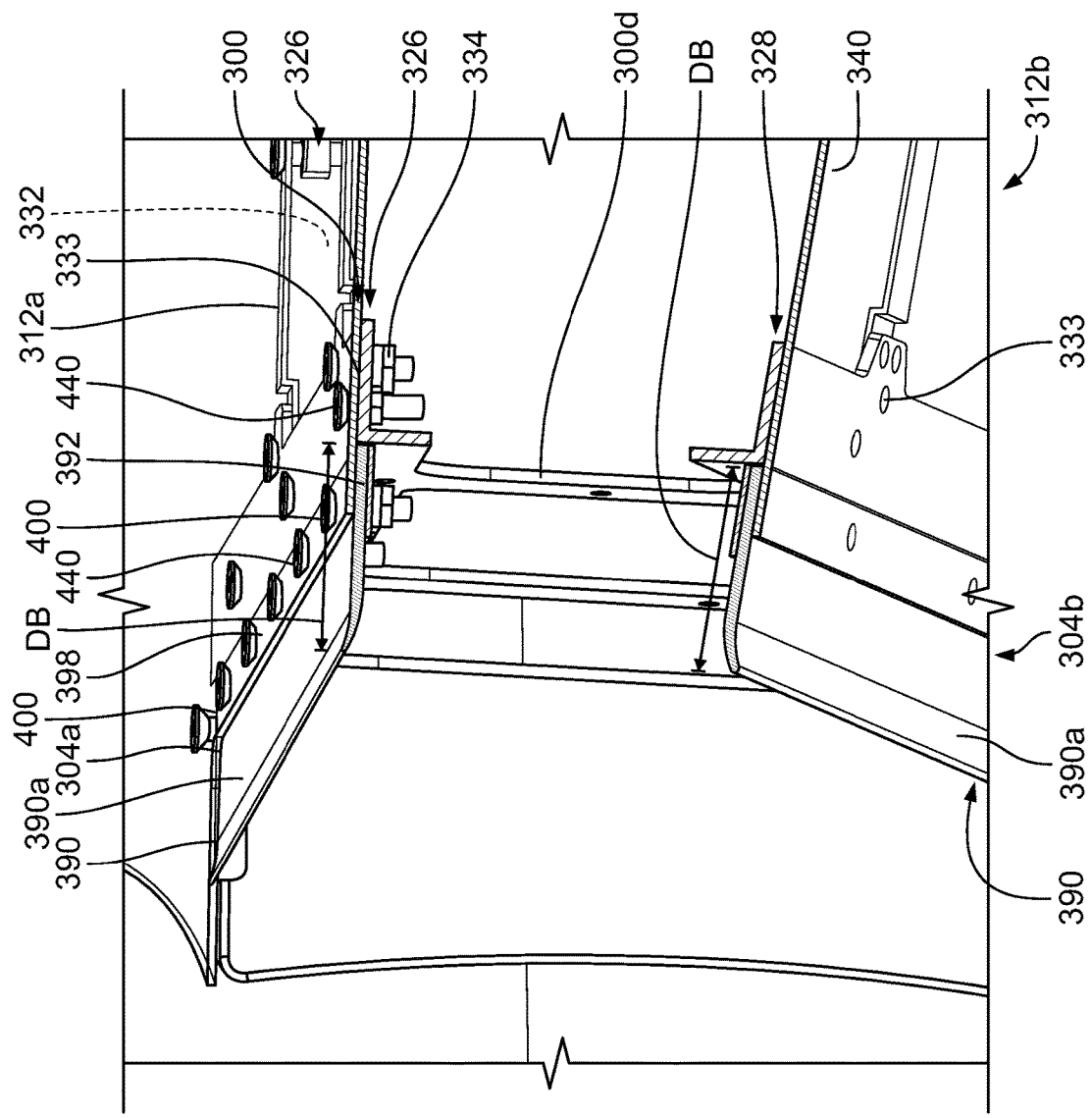
FIG. 9 is a cross-sectional view of the engine pylon, taken along line 9-9 of FIG. 7.

With brief reference to FIG. 7, the airframe longeron 300 extends along a longitudinal axis L2, which is a center line for the airframe longeron 300, and the first airframe flange 326 and the second airframe flange 328 extend along an axis transverse or oblique to the longitudinal axis L2. In one example, the first airframe flange 326 extends at an angle γ relative to the longitudinal axis L2 and the second airframe flange 328 extends at a negative of the angle γ relative to the longitudinal axis L2. The angle γ is about 5 degrees to about 8 degrees. With reference back to FIG. 8, the first airframe flange 326 and the second airframe flange 328 extend outwardly from the airframe base 320 at the first end 300a to the airframe apex 322 at the second end 300b. The first airframe flange 326 and the second airframe flange 328 are defined along opposite edges 330a, 330b of the airframe longeron 300 and extend outwardly from the second side 300d (FIG. 9). Generally, the first airframe flange 326 and the second airframe flange 328 are spaced apart at the airframe apex 322 to enable the receipt of mechanical fasteners proximate the airframe apex 322 to couple the seal 306 and the skin panel 312 to the airframe longeron 300.

The first airframe flange 326 defines a plurality of spaced apart airframe bores 332 from the airframe base 320 to the airframe apex 322. Each of the airframe bores 332 is configured to receive a fastener, such as a rivet 333 (FIG. 9), therethrough to couple the skin panel 312 to the first airframe flange 326. In one example, the fastener is the rivet 333, however, any suitable fastener may be used. In this example, an interior surface 326a of the first airframe flange 326 includes a plurality of airframe nut plates 334 (FIG. 9). Each of the airframe nut plates 334 is coupled to the interior surface 326a via rivets, for example, and is coaxial to a respective one of the airframe bores 332. The airframe nut plates 334 receive the end of the rivet 333 inserted into the respective airframe bore 332 to couple the skin panel 316 to the airframe longeron 300. The first airframe flange 326 also defines at least one rib protrusion 336. In this example, the first airframe flange 326 defines two rib protrusions 336a, 336b, which correspond with a respective one of the two airframe ribs 308a, 308b. The rib protrusions 336a, 336b each extend outwardly from the first airframe flange 326 and define a rib coupling bore 338 for coupling the respective airframe rib 308a, 308b to the airframe longeron 300.

With reference to FIG. 9, the second airframe flange 328 defines a plurality of spaced apart second airframe bores 340 from the airframe base 320 to the airframe apex 322. Each of the second airframe bores 340 is configured to receive the rivet 333 therethrough to couple the skin panel 312 to the second airframe flange 328. In this example, nut plates (not shown) may be used to secure the rivet 333 to the second airframe flange 328 during assembly, and thus, couple the skin panel 316 to the airframe longeron 300.

Figure 10:
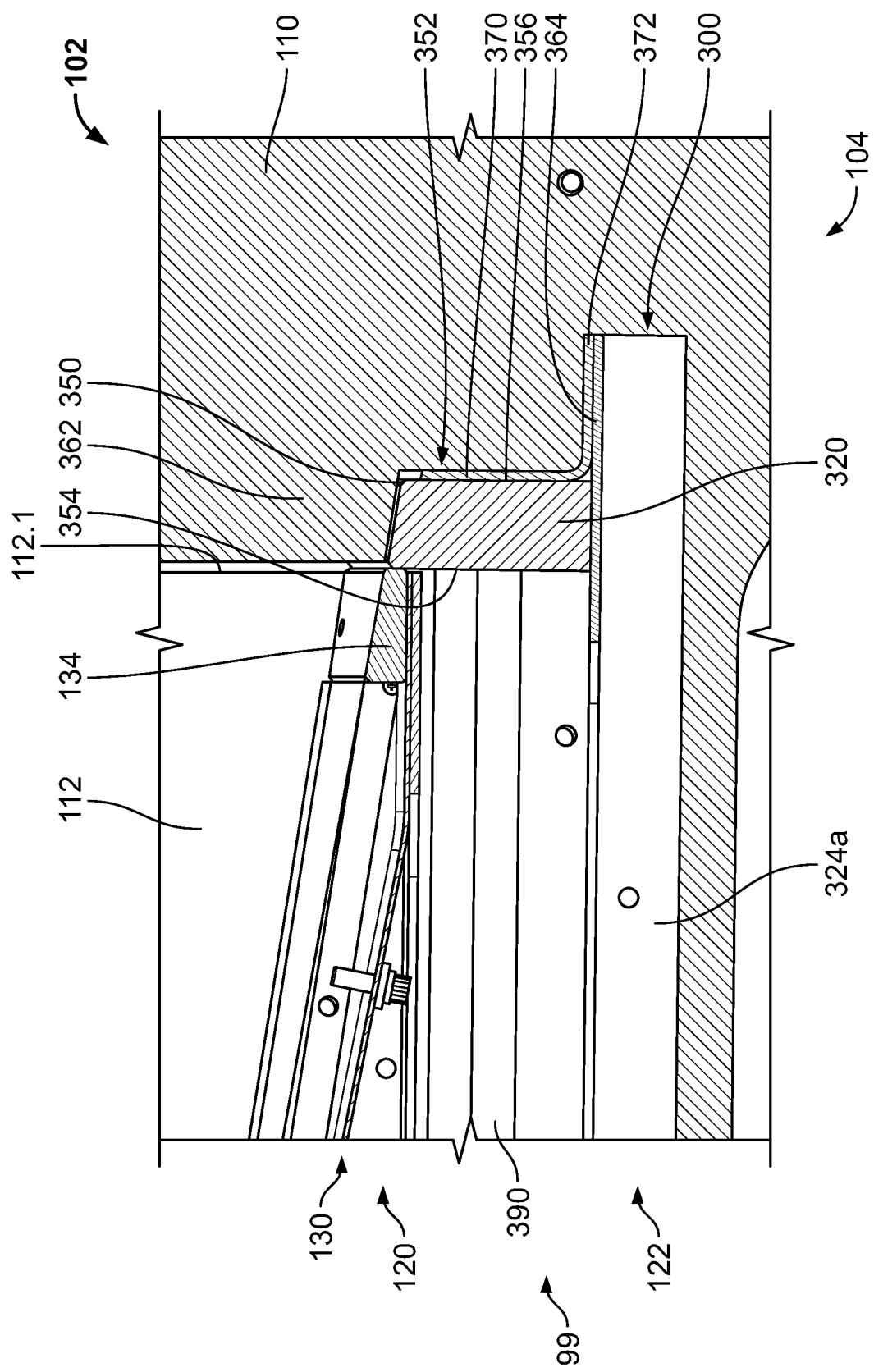
FIG. 10 is a cross-sectional view of the pylon system, taken along line 10-10 of FIG. 1, which illustrates the engine pylon in the first position when the transcowl is in the first, stowed position.

With reference back to FIG. 8, the forward seal assembly 302 includes a vehicle or airframe forward seal 350 and a seal bracket 352. The airframe forward seal 350 creates a seal between the engine pylon 120 and the vehicle pylon 122 (FIG. 10). The airframe forward seal 350 is composed of an elastomeric material, and is cast, molded, etc. The airframe forward seal 350 has a first airframe seal surface 354 opposite a second airframe seal surface 356, and a first airframe seal end 358 opposite a second airframe seal end 360. The airframe forward seal 350 also includes a first seal side 362 opposite a second seal side 364. In one example, the first airframe seal surface 354 faces aft or toward the airframe apex 322 and seals against the engine pylon 120 in the first, stowed position (FIG. 10). The first airframe seal surface 354 and the second airframe seal surface 356 are generally smooth and planar. The second airframe seal surface 356 is coupled to the seal bracket 352. The first airframe seal end 358 is positioned adjacent to the first airframe flange 326 of the airframe longeron 300. The second airframe seal end 360 is positioned adjacent to the second airframe flange 328 of the airframe longeron 300. The first airframe seal end 358 and the second airframe seal end 360 each define a recess 366 for coupling the at least one seal 306 to the forward seal assembly 302. The coupling of the at least one seal 306 to the airframe forward seal 350 ensures that the at least one seal 306 remains in contact with the engine pylon 120 over an entirety of the vehicle pylon 122. The first seal side 362 has a concave curvature to assist in forming a seal against the nacelle 110 (FIG. 10). The second seal side 364 is substantially planar to mate against a surface of the airframe base 320.

The seal bracket 352 couples the airframe forward seal 350 to the airframe longeron 300 (FIG. 10). The seal bracket 352 is composed of polymer-based material, metal, or metal alloy, and is cast, stamped, machined, additively manufactured, etc. In one example, the seal bracket 352 is L-shaped, and includes a seal portion 370 and a coupling portion 372. The seal portion 370 is substantially normal to the coupling portion 372. The seal portion 370 is coupled to the airframe forward seal 350 and is planar. In one example, the airframe forward seal 350 is coupled to the seal bracket 352 via nut plates that are attached to the seal bracket 352. The nut plates are attached to the seal bracket 352 via riveting, for example. The rivets are then used to secure the airframe forward seal 350 to the seal bracket 352. The coupling portion 372 is coupled to the airframe base 320 and is planar. In one example, the coupling portion 372 is coupled to the airframe base 320 via welding, however, adhesives, mechanical fasteners and the like may be used.

In one example, with reference to FIG. 8, the at least one seal fastening assembly 304 includes two seal fastening assemblies 304a, 304b. In one example, each of the seal fastening assemblies 304a, 304b is a nut plate strip, which includes a plurality of seal nut plates 374 fixedly coupled to an elongated body 376. Each of the seal nut plates 374 and the bodies 376 are composed of a metal or metal alloy, and are stamped, cast, forged, additively manufactured, etc. The seal nut plates 374 are generally formed discretely from the bodies 376, and are coupled to the bodies 376 via welding, for example. Each seal nut plates 374 is coaxial with a hole 378 defined through the body 376. Each body 376 has a first body end 380 opposite a second body end 382. The first body end 380 is coupled to the at least one seal 306 proximate the airframe forward seal 350, and the second body end 382 extends to proximate the airframe apex 322. The seal fastening assembly 304a extends next to, proximate or along the first side 300c proximate the first airframe flange 326, and the seal fastening assembly 304b extends next to, proximate or along the first side 300c proximate the second airframe flange 328. As will be discussed, the seal fastening assemblies 304a, 304b enable the at least one seal 306 to be coupled to the at least one skin panel 312.

In this example, the at least one seal 306 comprises two seals 306a, 306b. Each seal 306a, 306b is composed of an elastomeric material, and is extruded, cast, molded, etc. Each of the seals 306a, 306b is the same, and includes a blade seal 390 and a fastening strip 392 that each extend from a first seal end 394 to a second seal end 396. The first seal end 394 of each of the seals 306a, 306b is coupled to the at least one skin panel 312 and the second seal end 396 of the airframe forward seal 350 to extend from the airframe forward seal 350 to at or beyond the airframe apex 322. The blade seal 390 extends outwardly from the fastening strip 392 and is substantially planar. Generally, with reference to FIG. 9, the blade seal 390 extends a distance DB beyond the at least one skin panel 312 to contact the first skin panel surface 230 and the second skin panel surface 232. In one example, the distance DB is about 1.5 inches (in.) to about 2.5 inches (in.). A surface 390a of each blade seal 390 is positioned against and in contact with the first skin panel surface 230 and the second skin panel surface 232 of the engine pylon 120, respectively, and enables the first skin panel surface 230 and the second skin panel surface 232 to move or slide along each of the blade seals 390 as the engine pylon 120 moves relative to the vehicle pylon 122 (FIG. 13), as will be discussed. The fastening strip 392 includes a plurality of spaced apart seal bores 398 that extend through the seal 306a, 306b to receive a mechanical fastener, such as a rivet 400, to couple the seals 306a, 306b to the at least one skin panel 312.

Figure 11:
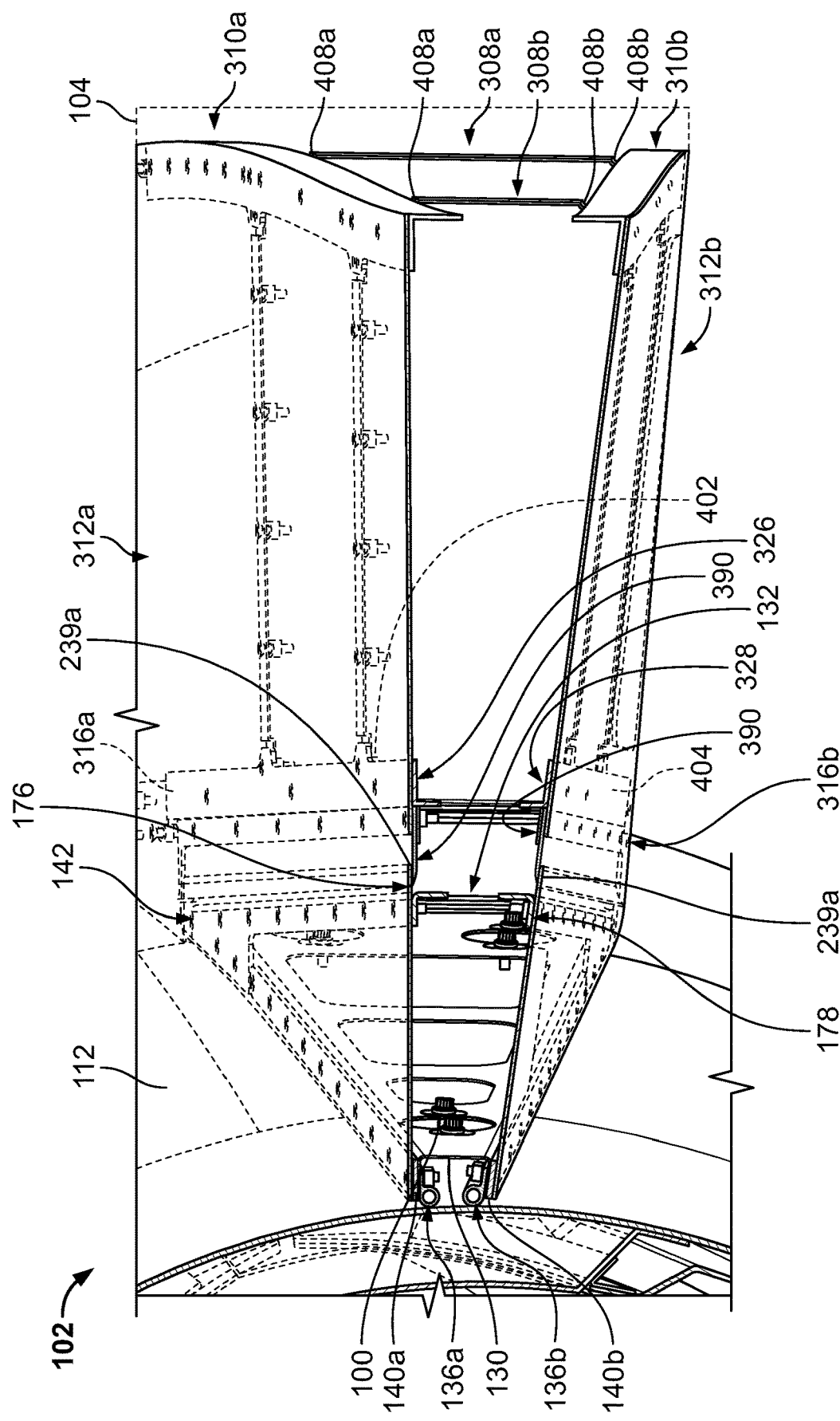
FIG. 11 is a cross-sectional view of the pylon system, taken along line 11-11 of FIG. 1.

With reference to FIG. 8, the at least one airframe rib 308 supports the at least one skin panel 312 between the airframe longeron 300 and the at least one airframe beam 310. In one example, the at least one airframe rib 308 includes two airframe ribs 308a, 308b. In this example, the airframe rib 308a is larger than the airframe rib 308b due to the triangular shape of the vehicle pylon 122. The airframe rib 308a is positioned adjacent to the airframe longeron 300 between the cut-outs 324a, 324b, and the airframe rib 308b is positioned adjacent to the airframe longeron 300 between the cut-outs 324b, 324c. The airframe ribs 308a, 308b are received between the first airframe flange 326 and the second airframe flange 328. In one example, each of the airframe ribs 308a, 308b include a first notch 402 and a second notch 404, which are defined on opposite sides of the airframe ribs 308a, 308b to enable the airframe ribs 308a, 308b to be received between the first airframe flange 326 and the second airframe flange 328. The first notch 402 and the second notch 404 are each defined on a first side 406 of the airframe ribs 308a, 308b, which is opposite a second side 408. The first side 406 is coupled to the airframe longeron 300, and the second side 408 is coupled to the at least one airframe beam 310. The second side 408 includes L-shaped grooves 408a, 408b (FIG. 11). The L-shaped grooves 408a, 408b assist in coupling the at least one airframe beam 310 to the airframe ribs 308a, 308b. The airframe ribs 308a, 308b may also include a plurality of rib bores 410, which may be defined along a top side 412 and a bottom side 414 of the airframe ribs 308a, 308b. The rib bores 410 are spaced apart along each of the top side 412 and the bottom side 414, and may be threaded to enable a mechanical fastener, such as a rivet 416 (FIG. 7), to couple the at least one skin panel 312 or the at least one airframe beam 310 to the airframe ribs 308a, 308b.

In this example, the at least one airframe beam 310 includes two airframe beams 310a, 310b. The airframe beams 310a, 310b are composed of a polymer-based material, metal, or metal alloy, and are cast, forged, stamped, additively manufactured, etc. Each of the airframe beams 310a, 310b are L-shaped, and include a skin coupling portion 420 and a side portion 422. The skin coupling portion 420 is about normal to the side portion 422. The skin coupling portion 420 of the airframe beam 310a extends substantially parallel with the first airframe flange 326, and the skin coupling portion 420 of the airframe beam 310b extends substantially parallel with the second airframe flange 328. The skin coupling portion 420 includes a plurality of holes 424 for receiving a mechanical fastener, such as a rivet 426 (FIG. 7), for coupling the at least one skin panel 312 to the airframe beams 310a, 310b. The side portion 422 is coupled to the airframe ribs 308a, 308b and provides rigidity to the vehicle pylon 122. Generally, the airframe beams 310a, 310b provide structural strength for attaching the at least one skin panel 312 to the vehicle pylon 122.

The at least one skin panel 312 encloses a portion of the vehicle pylon 122. In this example, the at least one skin panel 312 includes two skin panels 312a, 312b. Each of the skin panels 312a, 312b is composed of a polymer-based material, metal, or metal alloy, and is stamped, machined, cast, additively manufactured, etc. The skin panels 312a, 312b cooperate to enclose the airframe longeron 300, the airframe ribs 308a, 308b and the airframe beams 310a, 310b and to define an exterior surface of the vehicle pylon 122. Each of the skin panels 312a, 312b include a first panel side 430 opposite a second panel side 432 and a first panel end 434 opposite a second panel end 436. The first panel side 430 is proximate the engine pylon 120, and includes a cut-out region 438. The cut-out region 438 is defined to enable the engine pylon 120 to engage and move along the seals 306a, 306b. The second panel side 432 is coupled to the aircraft 104 (FIG. 1) and a portion of the second panel side 432 is coupled to the airframe beams 310a, 310b. The first panel end 434 of each of the skin panels 312a, 312b are coupled together to enclose the first panel end 434 (FIG. 1). The second panel end 436 of each of the skin panels 312a, 312b are coupled together to enclose the second panel end 436 (FIG. 1). Generally, the skin panels 312a, 312b are slightly different in exterior shape to provide the predetermined optimal shape for the vehicle pylon 122 based on the aerodynamics associated with the aircraft 104.

Each of the skin panels 312a, 312b also include a plurality of panel bores 440. A portion of the panel bores 440 are defined through the skin panel 312a proximate the first panel side 430 to couple the skin panel 312a to the skin panel 312b, the airframe longeron 300, the seal 306a, the seal fastening assembly 304a and the airframe ribs 308a, 308b. A portion of the panel bores 440 are defined through the skin panel 312b proximate the first panel side 430 to couple the skin panel 312b to the skin panel 312a, the airframe longeron 300, the seal 306b, the seal fastening assembly 304b and the airframe ribs 308a, 308b. In one example, with reference to FIG. 9, the rivet 333 is inserted through the panel bore 440 of the skin panel 312a, the first airframe flange 326 and is secured with the airframe nut plates 334. The rivet 400 is inserted through the panel bore 440 of the skin panel 312a, the seal bore 398, the hole 378 of the seal fastening assembly 304a and is secured with the respective seal nut plates 374. The rivet 333 is inserted through the panel bore 440 of the skin panel 312b, the second airframe flange 328 and is secured with the airframe nut plates 334. The rivet 400 is inserted through the panel bore 440 of the skin panel 312b, the seal bore 398, the hole 378 of the seal fastening assembly 304b and is secured with the respective seal nut plates 374. A portion of the panel bores 440 are defined through the skin panel 312a proximate the second panel side 432 to couple the skin panel 312a to the airframe ribs 308a, 308b and the airframe beams 310a, 310b. A portion of the panel bores 440 are defined through the skin panel 312b proximate the second panel side 432 to couple the skin panel 312b to the airframe ribs 308a, 308b and the airframe beams 310a, 310b. A portion of the panel bores 440 are defined to extend between the first panel side 430 and the second panel side 432 and are coaxially aligned with a respective one of the rib bores 410 to couple the skin panel 312a, 312b to the airframe ribs 308a, 308b with a respective one of the rivets 416 (FIG. 7).

In addition, the skin panel 312b defines an airframe access opening 450, which is enclosed with a removable airframe access panel 452. With reference to FIG. 7, the airframe access opening 450 is defined so as to be proximate the cut-out 324a of the airframe longeron 300 to provide access to the fastening aperture 154a, 154b (FIG. 2) to enable adjustment of the coupling between the engine pylon 120 and the transcowl 112 during installation and use. The airframe access opening 450 is generally sized to enable an operator to insert their hand and manipulate the fastening device coupled to the fastening aperture 154a, 154b, such as the locking positioning system 100, previously incorporated by reference herein. The airframe access panel 452 is composed of a polymer-based material, metal, or metal alloy, and is stamped, machined, cast, additively manufactured, etc. The airframe access panel 452 is coupled to the airframe access opening 450 via press-fit, mechanical fasteners, etc. Generally, the airframe access panel 452 is coupled to the airframe access opening 450 to be removable for maintenance, but secured during operation of the aircraft 104 (FIG. 1). It should be noted that the vehicle pylon 122 may include a number of other components, including, but not limited to, additional aircraft beams, fasteners, seals, pre-coolers, control valves, thrust links, etc. depending upon the aircraft 104, which are outside of the scope of the present disclosure.

With brief reference back to FIG. 3, in one example, in order to assemble the engine pylon 120, the spacers 140a, 140b are positioned on the respective one of the first flange 150 and the second flange 152. The elongated seals 136a, 136b are positioned adjacent to the respective one of the first flange 150 and the second flange 152 to be opposite the respective one of the spacers 140a, 140b. The fastening assemblies 138a, 138b are positioned on the fastening strips 216 of the respective elongated seals 136a, 136b. With the nut plates 186 and the second nut plates 196 coupled to the outboard longeron 132, the outboard longeron 132 is positioned over the inboard longeron 130 such that the projection 180 and the second projection 190 overlie the first flange 150 and the second flange 152, respectively, and are positioned adjacent to the spacers 140a, 140b. The forward seal 134 is coupled to the inboard longeron 130. The first base 144 of the inboard longeron 130 is coupled to the second base 170 of the outboard longeron 132. Generally, the inboard longeron 130 is coupled to the outboard longeron 132 at a first end 120a of the engine pylon 120 and is spaced apart from the outboard longeron 132 at a second end 120b of the engine pylon 120. The skin panel 142 is positioned about the inboard longeron 130 and the outboard longeron 132. The rivets 238 are inserted through respective ones of the skin panel bores 236 of the first skin panel surface 230, the coupling holes 228 of the spacer 140a, the seal holes 217 of the elongated seal 136a, the holes 222 of the fastening assembly 138a and are secured to the respective one of the nut plates 218. The rivets 238 are inserted through respective ones of the skin panel bores 236 of the second skin panel surface 232, the coupling holes 228 of the spacer 140b, the seal holes 217 of the elongated seal 136b, the holes 222 of the fastening assembly 138b and are secured to the respective one of the nut plates 218.

With reference to FIG. 2, with the engine pylon 120 assembled, the engine pylon 120 is coupled to the transcowl 112. In one example, the locking positioning system 100, previously incorporated by reference herein, is coupled to the transcowl 112 and the inboard longeron 130 to couple the engine pylon 120 to the gas turbine engine 102. Each of the locking positioning systems 100 may be adjusted along the slot serrations 164 defined by the fastening apertures 154a-154c to adjust a position of the gas turbine engine 102 along a Z-axis, in a rectangular coordinate system in which the X-axis is parallel to a center axis C of the gas turbine engine 102. Stated another way, the slot serrations 164 enable the locking positioning system 100 to secure the engine pylon 120 at various positions on the exterior of the transcowl 112. Once the engine pylon 120 is coupled to the gas turbine engine 102, the engine pylon 120 is coupled to the vehicle pylon 122.

With brief reference back to FIG. 8, in one example, in order to assemble the vehicle pylon 122, the airframe forward seal 350 is coupled to the seal bracket 352. The airframe ribs 308a, 308b are coupled to the first airframe flange 326 and the second airframe flange 328. The airframe beams 310a, 310b are coupled to the airframe ribs 308a, 308b. The seals 306a, 306b are positioned on the respective one of the first airframe flange 326 and the second airframe flange 328. The seal fastening assemblies 304a, 304b are positioned next to the respective one of the seals 306a, 306b. The skin panel 312b is coupled to the seal 306b, the airframe longeron 300, the airframe ribs 308a, 308b and the airframe beam 310b. The rivet 400 is inserted through the panel bore 440 of the skin panel 312b, the seal bore 398, the hole 378 of the seal fastening assembly 304b and is secured with the respective seal nut plate 374. The rivets 416 are each inserted through the panel bores 440 and the respective rib bores 410 to couple the airframe ribs 308a, 308b to the skin panel 312b. Fasteners, such as rivets, are each inserted through the panel bores 440 to couple the airframe ribs 308a, 308b to the airframe beam 310b. The skin panel 312a is coupled to the seal 306a, the airframe longeron 300, the airframe ribs 308a, 308b and the airframe beam 310a. The rivet 400 is inserted through the panel bore 440 of the skin panel 312a, the seal bore 398, the hole 378 of the seal fastening assembly 304a and is secured with the respective seal nut plate 374. The rivets 416 are each inserted through the panel bores 440 and the respective rib bores 410 to couple the airframe ribs 308a, 308b to the skin panel 312a. Fasteners, such as rivets, are each inserted through the panel bores 440 to couple the airframe ribs 308a, 308b to the airframe beam 310a. With the vehicle pylon 122 assembled, the vehicle pylon 122 is coupled to the airframe 106 of the aircraft 104 (FIG. 1). In one example, the vehicle pylon 122 is coupled to a beam of the airframe 106 to enable fuel, pneumatic, hydraulic, and electric energy to transfer from the gas turbine engine 102 to the aircraft 104.

With reference to FIG. 11, with the vehicle pylon 122 coupled to the aircraft 104, the engine pylon 120 is coupled to the vehicle pylon 122 to couple the gas turbine engine 102 to the aircraft 104. It should be noted that the gas turbine engine 102 may also be coupled to the airframe 106 of the aircraft 104 at additional locations, if desired. In one example, the first rail 239a and the second rail 239b defined by the respective portion of the first skin panel surface 230 and the second skin panel surface 232 that overhangs the outboard longeron 132 is positioned over the respective blade seal 390 of the vehicle pylon 122. Generally, a gap is defined between the first skin panel surface 230 and the skin panel 312a, and the second skin panel surface 232 and the skin panel 312b. The gap is about 0.800 inches (in.) plus or minus about 0.500 inches (in.). The first rail 239a and the second rail 239b are movable or slidable along the blade seal 390 until the transcowl 112 is in the first, stowed position of FIG. 1 and the engine pylon 120 is in the first position. Generally, the engine pylon 120 is coupled to the vehicle pylon 122 such that the skin panel 312a, 312b is substantially parallel with the first skin panel surface 230 and the second skin panel surface 232, respectively, and substantially parallel to the centerline C of the gas turbine engine 102 (FIG. 1) to reduce or substantially eliminate drag. In the first, stowed position, with reference to FIG. 10, the forward seal 134 of the engine pylon 120 is adjacent to and in contact with the airframe forward seal 350. The airframe access panel 452 enables an operator to adjust the coupling of the gas turbine engine 102 relative to the aircraft 104 once installed to ensure a proper alignment between the engine pylon 120 and the vehicle pylon 122 (FIG. 7). In addition, the access panel 242 of the engine pylon 120 enables further adjustment of the engine pylon 120 relative to the gas turbine engine 102 to further ensure that the gas turbine engine 102 is properly aligned with the aircraft 104 (FIG. 2), which also reduces drag.

Figure 12:
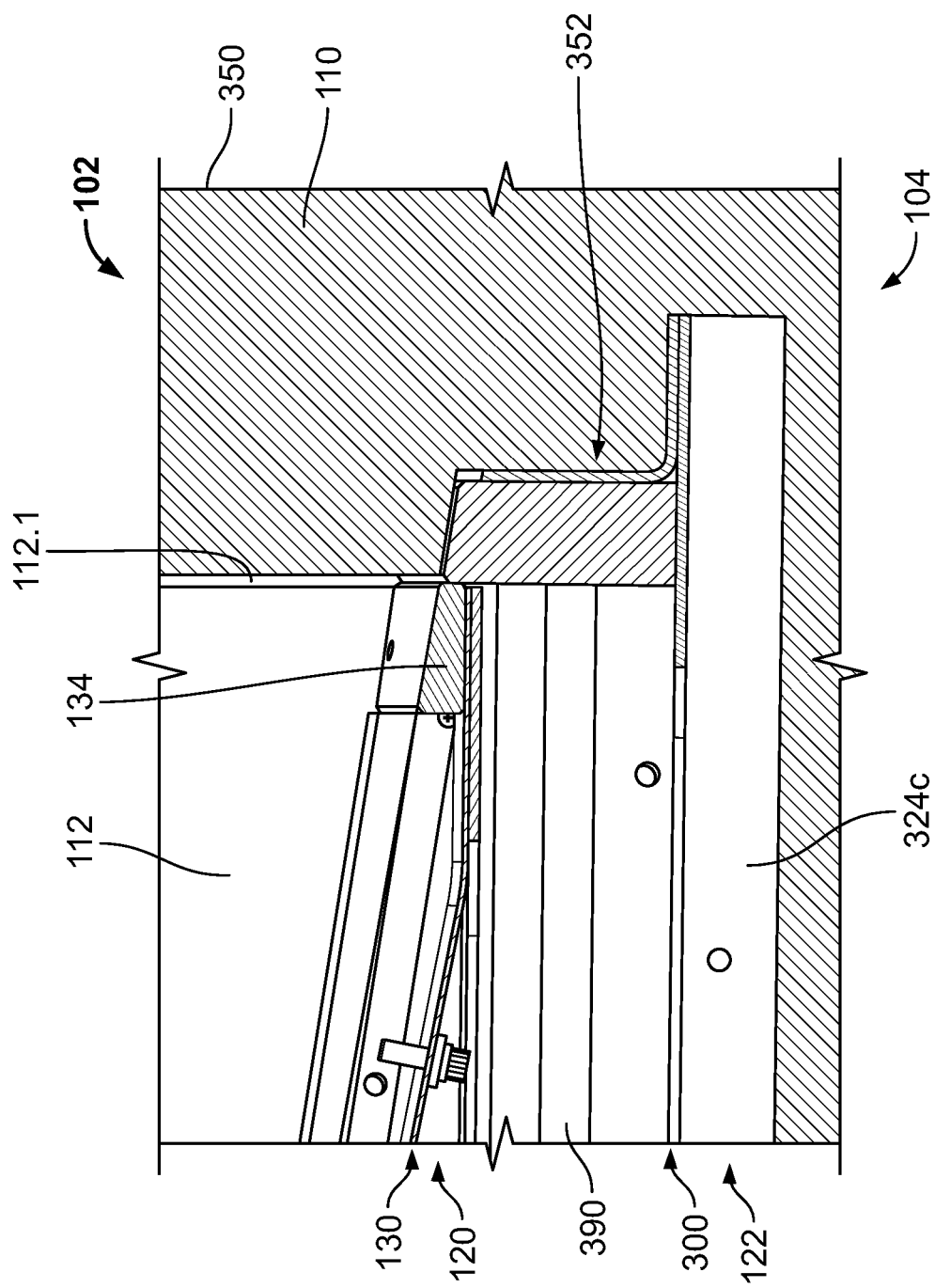
FIG. 12 is a cross-sectional view of the pylon system, taken from the perspective of line 10-10 of FIG. 1, which illustrates the engine pylon in a third position when the transcowl in a third, overstowed position.
Figure 13:
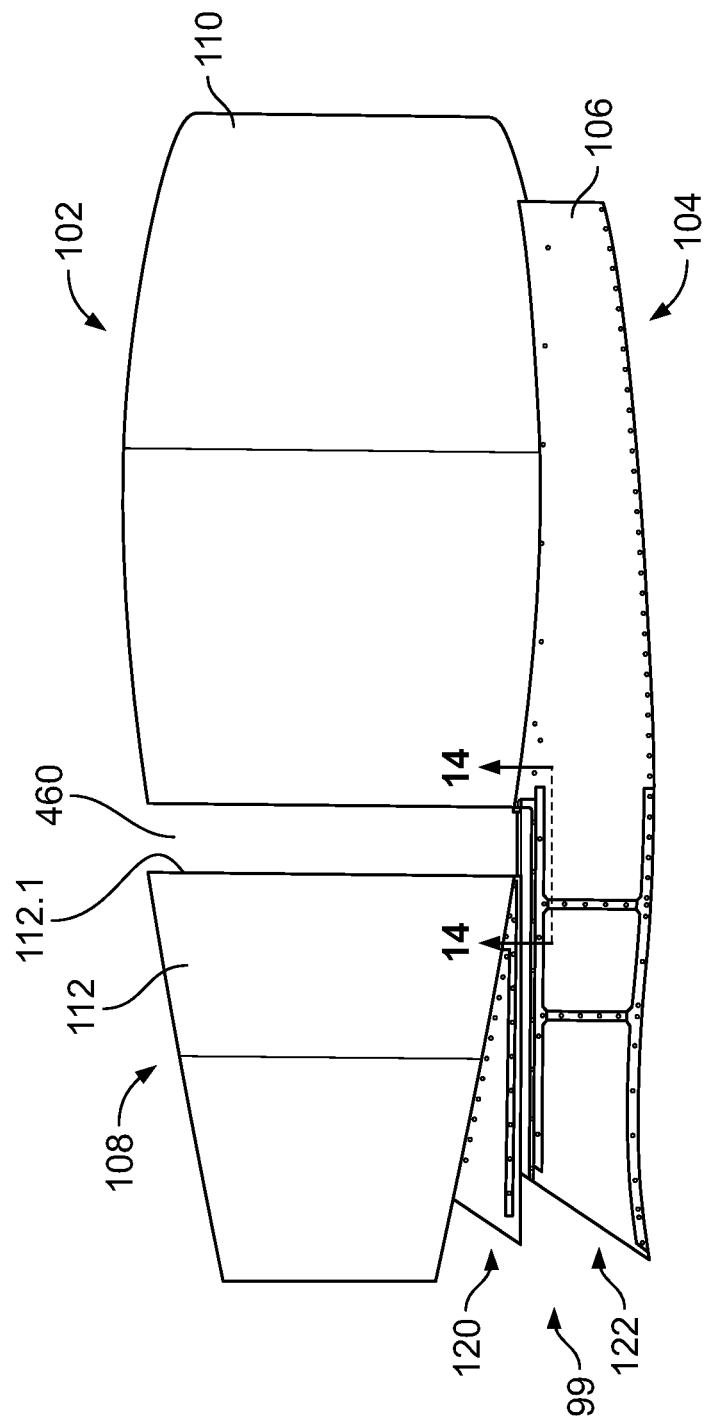
FIG. 13 is a top view of the pylon system, in which the transcowl associated with the thrust reverser of the gas turbine engine is in a second, deployed position and the engine pylon is in a second position.

During operation of the gas turbine engine 102, with reference to FIG. 12, the transcowl 112 may be moved, via signals to the actuator received from the controller associated with the gas turbine engine 102, to the third, overstowed position. In the third, overstowed position, the transcowl 112 is moved forward to unload locks associated with the transcowl 112 to enable the transcowl 112 to move to the second, deployed position. The advancement of the transcowl 112 relative to the gas turbine engine 102 causes the first rail 239a and the second rail 239b to move or slide along the blade seal 390 of the respective seals 306a, 306b until the engine pylon 120 is in the third position and the transcowl 112 is in the third, overstowed position. In the third position, the forward seal 134 of the engine pylon 120 compresses the airframe forward seal 350 to form a tight seal between the gas turbine engine 102 and the aircraft 104. In addition, during operation of the gas turbine engine 102, with reference to FIG. 13, the transcowl 112 may be moved, via signals to the actuator received from the controller associated with the gas turbine engine 102, to a second, deployed position. In the second, deployed position, the transcowl 112 is moved aft relative to the gas turbine engine 102 to define the aperture 460. With reference to FIG. 14, the aft movement of the transcowl 112 relative to the gas turbine engine 102 causes the first rail 239a and the second rail 239b to move or slide along the blade seal 390 of the respective seals 306a, 306b until the engine pylon 120 is in the second position and the transcowl 112 is in the second, deployed position. In the second, deployed position, the forward seal 134 of the engine pylon 120 is spaced a distance apart from the airframe forward seal 350.

Thus, with reference to FIG. 1, the pylon system 99 enables the gas turbine engine 102 to be mounted to a side of the aircraft 104 with the thrust reverser 108. By providing the engine pylon 120 movable relative to the vehicle pylon 122 between the first position, the second position and the third position, the transcowl 112 is also movable between the first, stowed position, the second, deployed position and the third, overstowed position, respectively, without interfering with the side or rear mounting of the gas turbine engine 102 to the aircraft 104. The ability to employ the transcowl 112 with the gas turbine engine 102 improves the stopping performance of the aircraft 104, which may be desirable in certain landing conditions. Moreover, by providing the inboard longeron 130 with the fastening apertures 154 (FIG. 5) that may be used with the locking positioning system 100, the position of the engine pylon 120 relative to the transcowl 112 is adjustable in multiple degrees of freedom, such as about 12 degrees of freedom, which enables the engine pylon 120 and the gas turbine engine 102 to be positioned at a position relative to the aircraft 104 that reduces or substantially eliminates drag. In addition, the elongated seals 136a, 136b, the forward seal 134, the airframe forward seal 350 and the seals 306a, 306b reduce leakage around the components of the pylon system 99.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A pylon system for coupling an engine to a vehicle, comprising:
   a vehicle pylon configured to be coupled to the vehicle, the vehicle pylon including a vehicle elongated seal along a portion of the vehicle pylon; and
   an engine pylon including an inboard longeron and an outboard longeron, the inboard longeron coupled to the outboard longeron at a first end of the engine pylon and spaced apart from the outboard longeron at a second end of the engine pylon, the engine pylon configured to be coupled to the engine, and the engine pylon is slidably coupled to the vehicle elongated seal such that the engine pylon is movable relative to the vehicle pylon along the vehicle elongated seal between at least a first position and a second position.

2. The pylon system of claim 1, wherein the engine includes a translating cowl thrust reverser that is movable, the engine pylon is configured to be coupled to the translating cowl thrust reverser of the engine and the engine pylon is configured to move with the translating cowl thrust reverser.

3. The pylon system of claim 1, wherein the inboard longeron further comprises a forward seal at the first end.

4. The pylon system of claim 3, further comprising a vehicle forward seal coupled to the vehicle pylon, and the forward seal is configured to contact the vehicle forward seal in the first position of the engine pylon.

5. The pylon system of claim 1, wherein at least a portion of the outboard longeron overlaps the inboard longeron at the first end.

6. The pylon system of claim 5, further comprising at least one spacer coupled to the inboard longeron proximate the outboard longeron to define a uniform exterior surface for the inboard longeron.

7. The pylon system of claim 1, wherein the inboard longeron further comprises an inboard seal that extends along the inboard longeron from the first end to the second end.

8. The pylon system of claim 1, further comprising an engine skin panel coupled to the inboard longeron and the outboard longeron from the first end to the second end, a vehicle skin panel coupled to the vehicle pylon, and the vehicle skin panel is substantially parallel with the engine skin panel.

9. The pylon system of claim 8, wherein each of the vehicle skin panel and the engine skin panel define at least one removable access panel.

10. The pylon system of claim 8, wherein the vehicle elongated seal of the vehicle pylon is coupled to the vehicle skin panel.

11. The pylon system of claim 8, wherein the vehicle pylon includes a vehicle longeron that is coupled to the vehicle skin panel.

12. The pylon system of claim 1, wherein the inboard longeron includes at least one fastening aperture configured to receive a fastener to couple the inboard longeron to the engine.

13. The pylon system of claim 12, wherein the at least one fastening aperture includes at least one serrated slot configured to receive the fastener.

14. The pylon system of claim 1, wherein the vehicle elongated seal of the vehicle pylon further comprises a pair of blade seals and the engine pylon is movable relative to the vehicle pylon along the pair of blade seals.

15. The pylon system of claim 1, further comprising a skin panel coupled to the inboard longeron and the outboard longeron such that the skin panel extends beyond the outboard longeron to define a rail, and the rail is slidably coupled to the vehicle elongated seal.

16. The pylon system of claim 1, wherein the engine is a gas turbine engine and the vehicle is an aircraft.

17. A pylon system for coupling an engine to a vehicle, comprising:

a vehicle pylon configured to be coupled to the vehicle, the vehicle pylon including a vehicle skin panel that defines an exterior surface of the vehicle pylon, and a vehicle elongated seal coupled to the vehicle skin panel that extends along a portion of the vehicle pylon; and an engine pylon including an inboard longeron, an outboard longeron and a skin panel that encloses the inboard longeron and the outboard longeron, the inboard longeron coupled to the outboard longeron at a first end of the engine pylon and spaced apart from the outboard longeron at a second end of the engine pylon, the engine pylon configured to be coupled to the engine, and the skin panel is coupled to the outboard longeron to define a rail that is slidably coupled to the vehicle elongated seal such that the engine pylon is movable relative to the vehicle pylon along the vehicle elongated seal between at least a first position and a second position.

18. The pylon system of claim 17, wherein the engine includes a translating cowl thrust reverser that is movable, the engine pylon is configured to be coupled to the translating cowl thrust reverser of the engine and the engine pylon is configured to move with the translating cowl thrust reverser.

19. The pylon system of claim 17, wherein the inboard longeron further comprises a forward seal at the first end and an inboard seal that extends along the inboard longeron from the first end to the second end, the vehicle pylon includes a vehicle forward seal coupled to the vehicle pylon, and the forward seal is configured to contact the vehicle forward seal in the first position of the engine pylon.

20. The pylon system of claim 17, wherein at least a portion of the outboard longeron overlaps the inboard longeron at the first end, and at least one spacer is coupled to the inboard longeron proximate the outboard longeron to define a uniform exterior surface for the inboard longeron.

* * * * *